US012706243B2

(12) United States Patent
Yoshioka et al.

(10) Patent No.: US 12,706,243 B2
(45) Date of Patent: Aug. 11, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Kiyotaka Nishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 916 days.

(21) Appl. No.: 17/831,382

(22) Filed: Jun. 2, 2022

(65) Prior Publication Data

US 2022/0392699 A1 Dec. 8, 2022

(30) Foreign Application Priority Data

Jun. 4, 2021 (JP) ................................ 2021-094446

(51) Int. Cl.
*H01F 5/00* (2006.01)
*H01F 27/28* (2006.01)
*H01F 27/32* (2006.01)
*H01F 27/34* (2006.01)

(52) U.S. Cl.
CPC ....... *H01F 27/346* (2013.01); *H01F 27/2866* (2013.01); *H01F 27/324* (2013.01)

(58) Field of Classification Search
CPC ..................................................... H01F 27/346
USPC .......................................................... 336/200
See application file for complete search history.

(56) References Cited

U.S. PATENT DOCUMENTS 3,614,554 A * 10/1971 Shield ................. H01F 17/0033 336/200
7,518,248 B2 * 4/2009 Li ....................... H01F 17/0033 257/773
2016/0307991 A1 * 10/2016 Kuo ......................... H10D 1/20

FOREIGN PATENT DOCUMENTS

JP H11-251146 A 9/1999
JP 2000-138120 A 5/2000
JP 2001-102218 A 4/2001
JP 2005-019747 A 1/2005
JP 2006-073958 A 3/2006
JP 2006-186137 A 7/2006

* cited by examiner

*Primary Examiner* — Ronald Hinson
(74) *Attorney, Agent, or Firm* — Studebaker Brackett PLLC

(57) ABSTRACT

An inductor component comprising a base; a coil in the base body and wound along a direction of an axis; and first and second external electrodes disposed on the base body and electrically connected to the coil. The base body includes first and second end surfaces and a second end surface at ends in the length direction, first and second side surfaces at ends in the width direction, and bottom and top surfaces at ends in the height direction. The first and second external electrodes are respectively disposed toward the first and second end surfaces with respect to a center in the length direction and exposed from an outer surface of the base body. When viewed from the first end surface in the length direction, at least a part of a respective portion of the first and second external electrodes exposed from the outer surface do not overlap.

20 Claims, 13 Drawing Sheets

INDUCTOR COMPONENT

CROSS REFERENCE TO RELATED APPLICATION

This application claims benefit of priority to Japanese Patent Application 2021-094446, filed Jun. 4, 2021, the entire content of which is incorporated herein by reference.

BACKGROUND

Technical Field

The present disclosure relates to an inductor component.

Background Art

A conventional inductor component is described in JP-A-11-251146. The inductor component includes a base body having a length, a width, and a height; a coil disposed in the base body and wound along an axial direction; and a first external electrode and a second external electrode both disposed on the base body and electrically connected to the coil. The base body includes a first end surface and a second end surface at both ends in the length direction; a first side surface and a second side surface at both ends in the width direction; and a bottom surface and a top surface at both ends in the height direction.

The first external electrode is disposed over the entire surface of the first end surface and on a part of each of the first side surface, the second side surface, the bottom surface, and the top surface. The second external electrode is disposed over the entire surface of the second end surface and on a part of each of the first side surface, the second side surface, the bottom surface, and the top surface.

SUMMARY

In the inductor component as in the prior art, the first external electrode and the second external electrode are so-called five-sided electrodes and hence become larger in size, resulting in increased stray capacitance between the coil and the first and second external electrodes.

Therefore, the present disclosure provides an inductor component capable of reducing stray capacitance between the coil and the external electrodes.

An inductor component as an aspect of the present disclosure comprises a base body having a length, a width, and a height; a coil disposed in the base body and wound along a direction of an axis; and a first external electrode and a second external electrode both disposed on the base body and electrically connected to the coil. The base body includes a first end surface and a second end surface at both ends in the length direction, a first side surface and a second side surface at both ends in the width direction, and a bottom surface and a top surface at both ends in the height direction. The first external electrode is disposed toward the first end surface with respect to a center in the length direction of the base body so as to be exposed from an outer surface of the base body. The second external electrode is disposed toward the second end surface with respect to the center in the length direction of the base body so as to be exposed from the outer surface of the base body. When viewed from the first end surface side in the length direction, at least a part of a portion of the first external electrode exposed from the outer surface of the base body does not overlap at least a part of a portion of the second external electrode exposed from the outer surface of the base body. When viewed from the first end surface side in the length direction, a center-of-gravity position of an area of the portion of the first external electrode exposed from the outer surface of the base body lies opposite to the center-of-gravity position of the area of the portion of the second external electrode exposed from the outer surface of the base body with respect to a center in the width direction of the base body.

As used herein, the center-of-gravity position of the area of the external electrode refers to a center position of the area of the external electrode distributed in the width direction of the base body, when viewed from the first end surface **100*e*1** side in the length direction of the base body. For example, if the external electrode includes two figures A and B, when viewed from the first end surface side in the length direction of the base body, a center-of-gravity position X of the area of the external electrode is found from $$X=(Sa\times Xa+Sb\times Xb)/(Sa+Sb)$$

where: Sa is the area of the figure A and Xa is the center-of-gravity position of the figure A in the width direction of the base body; and Sb is the area of the figure B and Xb is the center-of-gravity position of the figure B in the width direction of the base body.

The "outer surface of the base body" including the first end surface, second end surface, first side surface, second side surface, bottom surface, and top surface of the base body does not mean a mere surface facing the outer peripheral side of the base body but means a surface serving as a boundary between the outside and the inside of the base body. "Above the outer surface of the base body" refers to a direction toward the outside, of the outside and the inside of the outer surface as the boundary, with respect to the outer surface, instead of referring to one absolute direction like vertically above defined by the direction of gravity. Accordingly, "above the outer surface" is a relative direction defined by the orientation of the outer surface. "Above" an element includes not only above the element with a space in between, i.e., an upper position via another object on the element or a spaced-apart upper position, but also a position directly on the element in contact therewith.

According to the embodiment, when viewed from the first end surface side in the length direction of the base body, at least a part of the first external electrode and at least a part of the second external electrode do not overlap each other, whereupon the first external electrode and the second external electrode can be reduced in size, enabling decrease in stray capacitance between the coil and the first and second externals electrodes.

When viewed from the first end surface side in the length direction of the base body, the center-of-gravity position of the area of the first external electrode lies opposite to the center-of-gravity position of the area of the second external electrode with respect to the center in the width direction of the base body, with the result that the tilt or rotation of the inductor component relative to a mount substrate can be reduced when connecting the first and second external electrodes of the inductor component 1 to the mount substrate via solder with the bottom surface of the base body facing the mount substrate, thereby achieving stable mounting attitude of the inductor component.

Preferably, in an embodiment of the inductor component, the base body comprises a substrate having a bottom surface and a top surface at both ends in the height direction; and an insulating layer covering each of the bottom surface and the top surface of the substrate. The coil comprises a bottom surface wire arranged above the bottom surface of the substrate and covered with the insulating layer; a top surface wire arranged above the top surface of the substrate and covered with the insulating layer; and a pair of through wires extending through the substrate from the bottom surface to the top surface, each being arranged opposite to the other with respect to the axis, the bottom surface wire, a first through wire of the pair of through wires, the top surface, and a second through wire of the pair of through wires being connected in order, to constitute at least a part of the coil wound in the direction of the axis.

According to the embodiment, because the coil is a coil with a so-called helical shape, it is possible to reduce the region where the bottom surface wire, the top surface wire, and the through wires run in parallel along the winding direction of the coil in a section orthogonal to the axis and to thereby decrease the stray capacitance of the coil.

Preferably, in an embodiment of the inductor component, the first external electrode is disposed continuously on first end surface and the bottom surface, while the second external electrode is disposed continuously on the second end surface and the bottom surface.

According to the embodiment, the first external electrode and the second external electrode are so-called L-shaped electrodes, so that solder fillet can be formed on the first and second external electrodes when mounting the inductor component on the mount substrate. As a result, the inductor component can have improved mounting strength and more stabilized mounting attitude.

Preferably, in an embodiment of inductor component, the first external electrode is disposed continuously on first end surface and the bottom surface, and when viewed from the first end surface side in the length direction, a first end surface portion of the first external electrode disposed on the first end surface lies on a same side, with respect to the center in the width direction of the base body, as the through wire lies to which the first external electrode is connected.

The embodiment can shorten the length of the extended portion extending from the first end surface portion of the first external electrode up to the through wire, thereby rendering it possible to reduce the size of the first external electrode and to decrease the stray capacitance between the coil and the first external electrode.

Preferably, in an embodiment of the inductor component, when viewed from the first end surface side in the length direction, a first end surface portion of the first external electrode disposed on the first end surface and a second end surface portion of the second external electrode disposed on the second end surface do not overlap each other.

As used herein, the first end surface portion and the second end surface portion not overlapping each other includes the case where at least one of the first end surface portion and the second end surface is not formed from the very first.

The embodiment can reduce the size of the first external electrode and the second external electrode to decrease the stray capacitance between the coil and the first and second external electrodes.

In an embodiment of the inductor component, the first external electrode is disposed continuously on first end surface and the bottom surface, and when viewed from the first end surface side in the length direction, a first end surface portion of the first external electrode disposed on the first end surface includes three or more regions each having a dimension different in the width direction along the height direction.

As used herein, the dimension in the width direction refers to a maximum value in the width direction.

According to the embodiment, the shape of the first external electrode can be optimized to control the amount of solder fillet.

Preferably, in an embodiment of the inductor component, the three or more regions of the first end surface portion have alternately changing dimensions in the width direction along the height direction in their magnitude relations.

According to the embodiment, by taking into consideration the processing deviation occurring when forming the regions through stacking, the positional offset can be prevented between the regions, enabling electrical connections between the regions to be ensured.

Preferably, in an embodiment of the inductor component, the three or more regions of the first end surface portion each have side edges at both ends in the width direction, and when viewed from the length direction, the side edges have a different tilt angle relative to the height direction for each of the regions.

According to the embodiment, by taking into consideration the processing deviation occurring when forming the regions through stacking, the positional offset can be prevented between the regions, enabling electrical connections between the regions to be ensured.

Preferably, in an embodiment of the inductor component, a first end surface portion of the first external electrode disposed on the first end surface and a second end surface portion of the second external electrode disposed on the second end surface do not overlap the axis of the coil.

The embodiment can reduce interference of the first end surface portion and the second end surface portion with the magnetic flux of the coil, achieving improvement in the inductance acquisition efficiency.

Preferably, in an embodiment of the inductor component, when viewed from the direction of the axis of the coil, the first end surface portion and the second end surface portion do not overlap an inner diameter part of the coil.

The embodiment can reduce interference of the first end surface portion and the second end surface portion with the magnetic flux of the coil, achieving further improvement in the inductance acquisition efficiency.

Preferably, in an embodiment of the inductor component, a first end surface portion of the first external electrode disposed on the first end surface and a second end surface portion of the second external electrode disposed on the second end surface each have a dimension in the height direction that is one half or more of a dimension in the height direction of the base body.

As used herein, the dimension in the height direction refers to a maximum value in the height direction.

The embodiment can improve the mounting strength via the solder fillet of the first external electrode and the second external electrode.

Preferably, in an embodiment of the inductor component, the first external electrode is disposed continuously on the first end surface and the bottom surface, and a first end surface portion of the first external electrode disposed on the first end surface is at least partly raised from the first end surface.

According to the embodiment, because at least a part of the first end surface portion is raised from the first end surface, the first external electrode can have improved mountability. Also, at the time of characteristic selection in the subsequent process, electrical characteristics can easily be acquired.

Preferably, in an embodiment of the inductor component, the first external electrode and the second external electrode are disposed only on the bottom surface, and at least a part of the first external electrode and at least a part of the second external electrode protrude from the bottom surface outward of the base body.

According to the embodiment, because the first external electrode and the second external electrode are disposed only on the bottom surface, the first external electrode and the second external electrode can further be reduced in size to more decrease the stray capacitance between the coil and the first and second external electrodes.

Because at least a part of the first external electrode and at least a part of the second external electrode protrude from the bottom surface, good mountability of the first external electrode and the second external electrode can be ensured. Also, electrical characteristics can easily be acquired at the time of characteristic selection in the subsequent process.

Preferably, in an embodiment of the inductor component, the base body includes a single-layer glass plate.

As used herein, the single-layer glass plate is a concept in contrast to the laminated glass body, and more specifically, refers to a glass plate that does not incorporate therein an inner conductor, i.e. a conductor integrated in glass.

The embodiment can ensure the strength of the base body. In the case of the single-layer glass plate, Q value at high frequency can be increased due to small dielectric loss. Because there is no sintering process as in the case of a sintered body, deformation of the base body during sintering can be suppressed, thereby achieving suppression of the pattern deviation and provision of an inductor component with small inductance tolerance.

Preferably, in an embodiment of the inductor component, a part of the outer surface of the base body is made of a material different from that of remaining parts of the outer surface.

According to the embodiment, the color of the outer surface of the base body can partly change so that e.g. see-through of the internal structure of the base body can be prevented. A part of the outer surface of the base body can be used as a marker so that the inductor component can have a directivity.

Preferably, in an embodiment of the inductor component, the inductor component has a volume of 0.08 $mm^3$ or less, and the inductor component has a long side whose dimension is 0.65 mm or less.

As used herein, the long side dimension refers to a maximum value among the length, width, and height of the inductor component.

According to the embodiment, because the inductor component has a reduced volume and a reduced long side dimension, the weight of the inductor component becomes light. For this reason, a required mounting strength can be obtained despite the reduced size of the external electrodes.

Preferably, in an embodiment of the inductor component, when viewed from the height direction, the first external electrode and the second external electrode do not overlap the coil.

The embodiment can decrease the stray capacitance between the coil and the first and second external electrodes.

Preferably, in an embodiment of the inductor component, when viewed from the first end surface side in the length direction, a portion of the first external electrode exposed from the outer surface of the base body is equal in area to a portion of the second external electrode exposed from the outer surface of the base body.

According to the embodiment, the first external electrode and the second external electrode can have the same amount of solder for mounting the inductor component, allowing the inductor component to have a more stable attitude.

According to the inductor component that is one aspect of the present disclosure, the stray capacitance can be decreased between the coil and the external electrodes.

DETAILED DESCRIPTION

An inductor component as one aspect of the present disclosure will now be described in detail based on embodiments shown in drawings. The drawings partly include schematic ones and may not reflect actual dimensions or ratios.

First Embodiment

Figure 1:
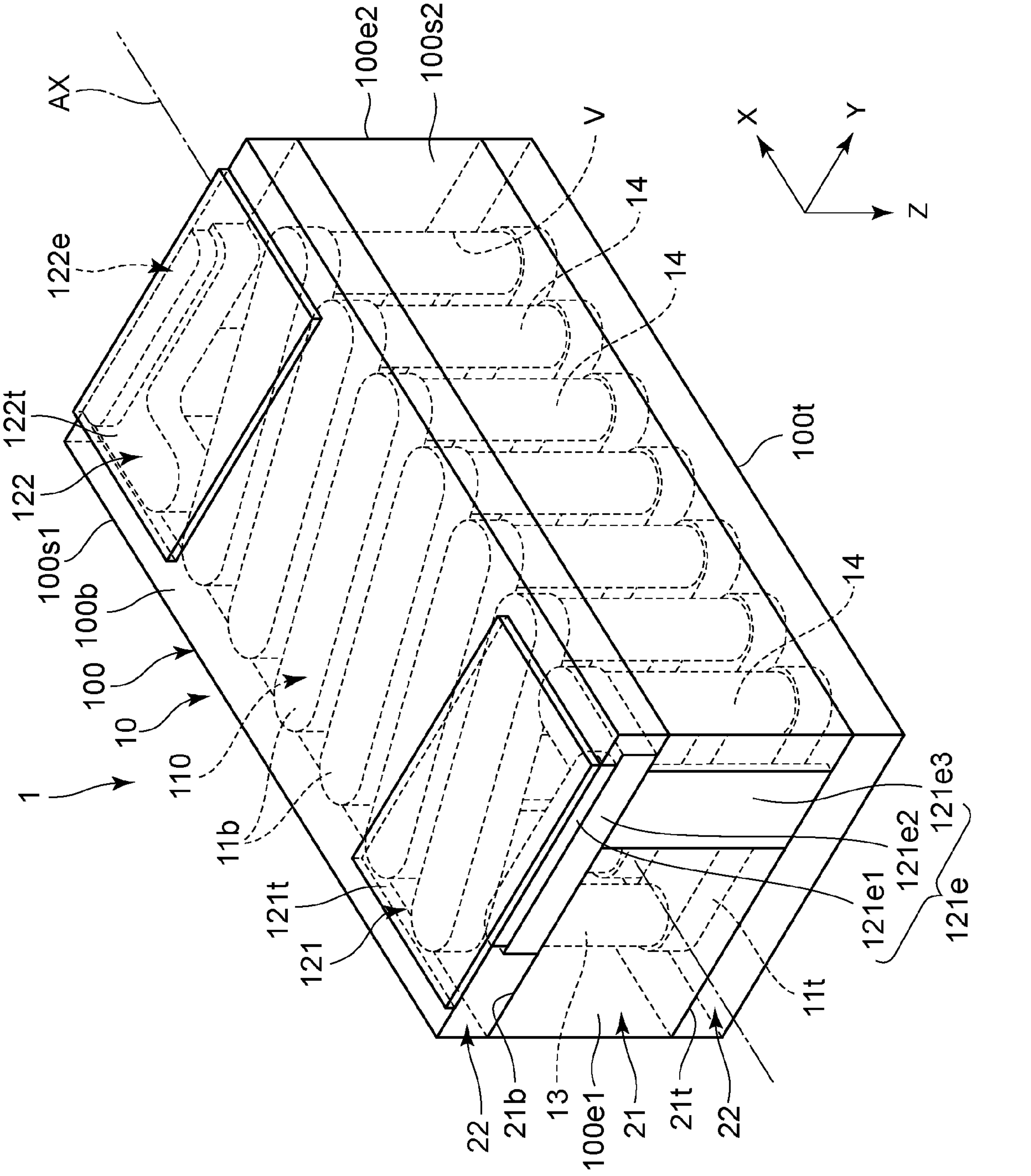
FIG. 1 is a schematic perspective view of an inductor component seen from a bottom surface side.
Figure 2:
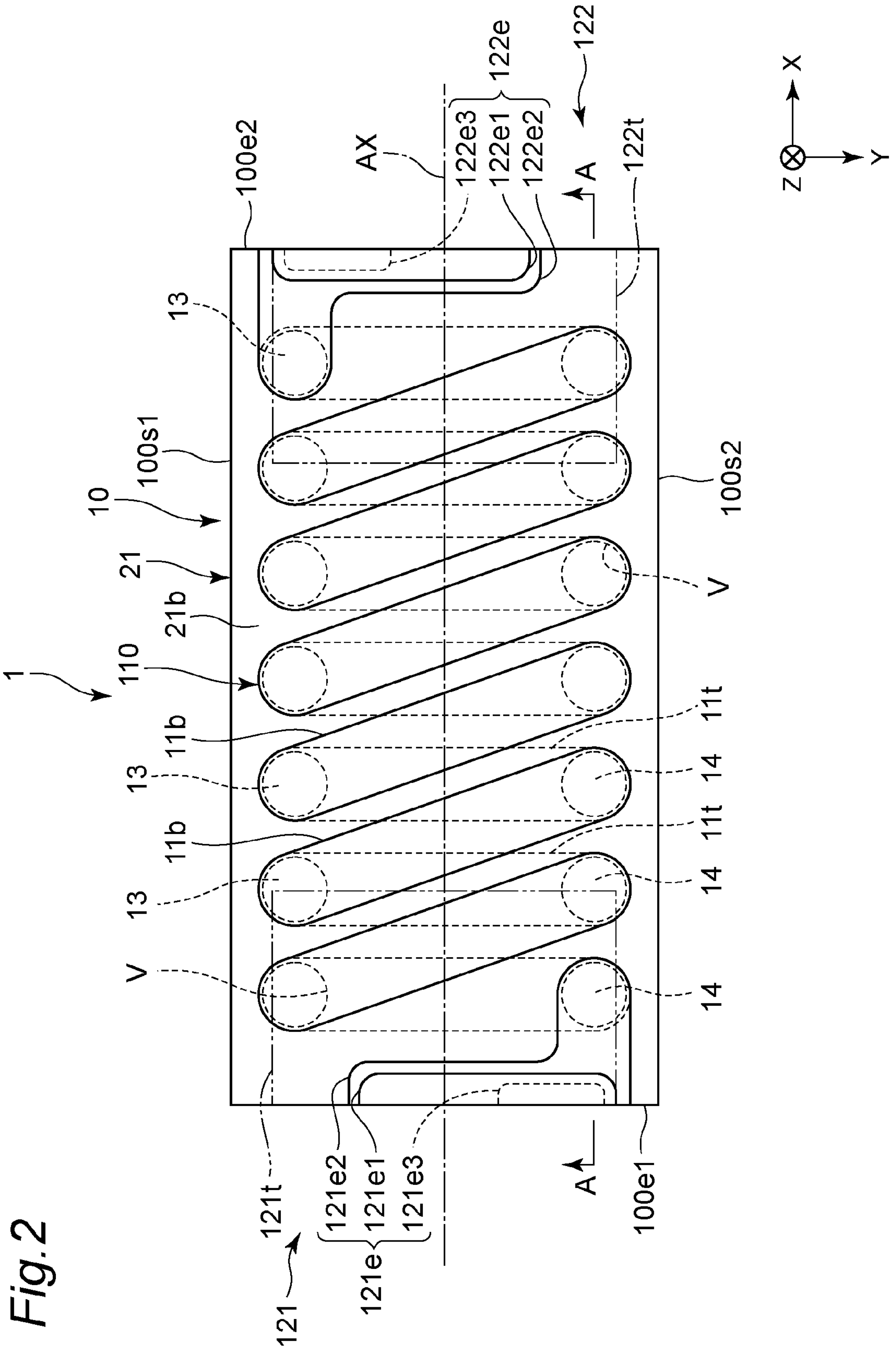
FIG. 2 is a schematic bottom view of the inductor component seen from the bottom surface side.
Figure 3:
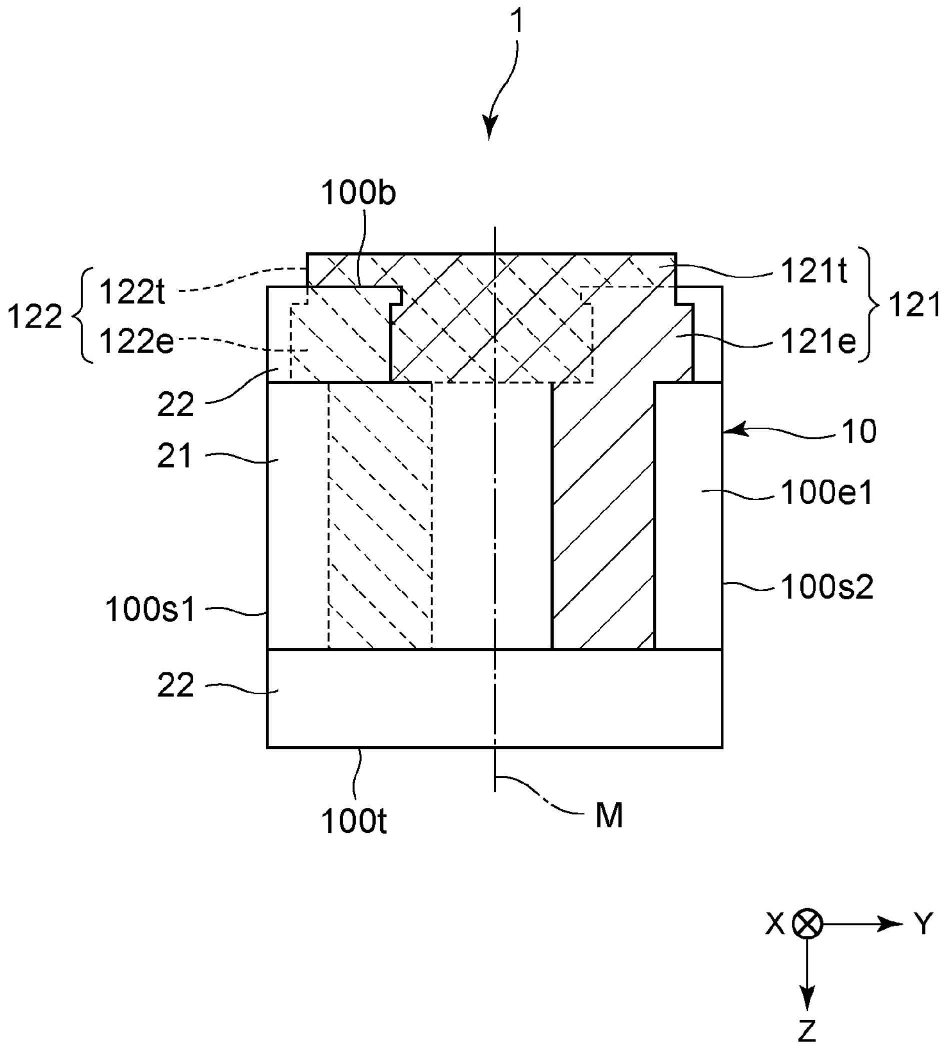
FIG. 3 is a schematic end view of the inductor component seen from a first end surface side.

An inductor component 1 according to a first embodiment will be described below. FIG. 1 is a schematic perspective view of the inductor component 1 seen from a bottom surface side. FIG. 2 is a schematic bottom view of the inductor component 1 seen from the bottom surface side. FIG. 3 is a schematic end view of the inductor component 1, seen from a first end surface side. In FIG. 2, for convenience, an insulation layer of a base body is not shown and a part (bottom surface portion) of each of external electrodes is indicated by a two-dot chain line.

1. Overview Structure

An overview structure of the inductor component 1 will be described. The inductor component 1 is e.g. a surface-mounted inductor component that is used in a high-frequency signal transmission circuit. As shown in FIGS. 1 and 2, the inductor component 1 comprises a base body 10, a coil 110 disposed in the base body 10 and wound along an axis AX direction, and a first external electrode 121 and a second external electrode 122 that are disposed on the base body 10 and electrically connected to the coil 110. The axis AX of the coil 110 is a straight line passing through a center of an inner-diameter part of the coil 110. The axis AX of the coil 110 has no dimensions in directions orthogonal to the axis AX.

The base body 10 has a length, a width, and a height. The base body 10 includes a first end surface **100*e*1 and a second end surface 100*e*2 at both ends in the length direction, a first side surface 100*s*1 and a second side surface 100*s*2 at both ends in the width direction, and a bottom surface 100*b* and a top surface 100*t* at both ends in the height direction. That is, an outer surface 100 of the base body 10 includes the first end surface 100*e*1 and the second end surface 100*e*2, the first side surface 100*s*1 and the second side surface 100*s*2, and the bottom surface 100*b* and the top surface 100*t***.

In the following, as shown in the drawings, for convenience of description, X direction is the length direction (longitudinal direction) of the base body 10 extending from the first end surface **100*e*1 toward the second end surface 100*e*2. Y direction is the width direction of the base body 10 extending from the first side surface 100*s*1 toward the second side surface 100*s*2. Z direction is the height direction of the base body 10 extending from the bottom surface 100*b* toward the top surface 100*t***. X direction, Y direction, and Z direction are directions orthogonal to one another and make up a right-handed system when arranged in the order of X, Y, and Z.

The first external electrode 121 is disposed toward the first end surface **100*e*1 with respect to a center in X detection of the base body 10 in such a manner as to be exposed from the outer surface 100 of the base body 10. The second external electrode 122 is disposed toward the second end surface 100*e*2 with respect to the center in X direction of the base body 10 in such a manner as to be exposed from the outer surface 100 of the base body 10**.

As shown in FIG. 3, when viewed from the first end surface **100*e*1 side in X direction, there is no overlap between at least a part of a portion of the first external electrode 121 exposed from the outer surface 100 of the base body 10 and at least a part of a portion of the second external electrode 122 exposed from the outer surface 100 of the base body 10. In FIG. 3, for convenience, the exposed portion of the first external electrode 121 is hatched by solid lines, while the exposed portion of the second external electrode 122** is hatched by broken lines.

When viewed from the first end surface **100*e*1 side in X direction, the center-of-gravity position of the area of the portion (the area of the region hatched by solid lines of FIG. 3) of the first external electrode 121 exposed from the outer surface 100 of the base body 10 lies opposite, with respect to a center M in Y direction of the base body 10, to the center-of-gravity position of the area of the portion (the area of the region hatched by broken lines of FIG. 3) of the second external electrode 122 exposed from the outer surface 100 of the base body 10. In other words, the center-of-gravity position of the area of the exposed portion of the first external electrode 121 when viewed from the first end surface 100*e*1 side in X direction lies on the same side, with respect to the center M in Y direction of the base body 10, as the center-of-gravity position of the area of the exposed portion of the second external electrode 122 when viewed from the second end surface 100*e*2** side in X direction.

According to the above configuration, because the first external electrode 121 and the second external electrode 122 do not at least partly overlap each other when viewed from the first end surface **100*e*1 side in X direction of the base body 10, the first external electrode 121 and the second external electrode 122 can be reduced in size so that stray capacitance can be decreased between the coil 110 and the first external electrode 121 and the second external electrode 122**.

Because when viewed from the first end surface **100*e*1 side in X direction of the base body 10, the center-of-gravity position of the area of the first external electrode 121 lies opposite to the center-of-gravity position of the area of the second external electrode 122 with respect to the center M in Y direction of the base body 10, the tilt or rotation of the inductor component 1 relative to a mount substrate can be reduced when connecting the first and second external electrodes 121 and 122 of the inductor component 1 to the mount substrate via solder with the bottom surface 100*b* of the base body 10** facing the mount substrate, thereby achieving stable mounting attitude of the inductor component.

2. Parts Configurations

<Inductor Component 1>

The inductor component 1 has a volume of 0.08 $mm^3$ or less and a long side dimension of 0.65 mm or less. The long side dimension of the inductor component 1 refers to a maximum value of the length, width and height of the inductor component 1, and in this embodiment, refers to the length in X direction. According to the above configuration, because the inductor component 1 has a reduced volume and a reduced long side dimension, the weight of the inductor component 1 is lightened. For this reason, a required mounting strength can be obtained despite the reduced size of the external electrodes 121 and 122.

Specifically, the size (length (X direction)×width×(Y direction)×height (Z direction) of the inductor component 1 is e.g. 0.6 mm×0.3 mm×0.3 mm, 0.4 mm×0.2 mm×0.2 mm, 0.25 mm×0.125 mm×0.120 mm, etc. The width and the height may not be equal, and the size may be e.g. 0.4 mm×0.2 mm×0.3 mm, etc.

<Base Body 10>

The base body 10 comprises a substrate 21 having a bottom surface **21*b* and a top surface 21*t* at both ends in Z direction, and an insulation layer 22 covering both of the bottom surface 21*b* and the top surface 21*t*** of the substrate 21. The insulation layer may be disposed only on the bottom surface 21*b*, of the bottom surface 21*b* and the top surface 21*t*.

The base body 10 preferably includes a single-layer glass plate. That is, the substrate 21 is preferably the single-layer glass plate. This can ensure the strength of the base body 10. In the case of the single-layer glass plate, Q value at high frequency can be increased due to small dielectric loss. Because there is no sintering process as in the case of a sintered body, deformation of the base body 10 during sintering can be suppressed, thereby achieving suppression of the pattern deviation and provision of an inductor component with small inductance tolerance.

From the viewpoint of fabrication method, the material of the single-layer glass plate is preferably a glass plate having photosensitivity represented by FoturanII (registered trademark of SchottAG company). In particular, the single-layer glass plate preferably contains cerium oxide (ceria: $CeO_2$). In this case, cerium oxide acts as a sensitizer to make processing by photolithography easier.

The single-layer glass plate may be a glass plate having no photosensitivity because it can be processed by machining such as drilling or sandblasting, dry/wet etching using e.g. a photoresist metal mask, laser processing, etc. The single-layer glass plate may be made of sintered glass paste or formed by a known method such as float glass process.

The single-layer glass plate is a plate-shaped member of a single layer not taking in wiring (a part of the coil 110) such as internal conductors integrated inside a glass body. In particular, the single-layer glass plate has an outer surface as a boundary between the outside and the inside of the glass body. Through holes V formed in the single-layer glass plate are also included in the outer surface 100 of the base body 10 because they are boundaries between the outside and the inside of the glass body.

The single-layer glass plate is basically in an amorphous state, but may include a crystalized portion. For example, in the case of the FoturanII, whereas glass in the amorphous state has a dielectric constant of 6.4, the dielectric constant can be reduced to 5.8 by crystalizing. This can reduce the stray capacitance between conductors (in wiring) in the vicinity of the crystallized portion.

The insulation layer 22 is a member that covers wires (a part of the coil 110) to serve to protect the wires from external forces to prevent damages on the wires or serve to improve the insulation properties of the wires. The insulation layer 22 is preferably e.g. an inorganic film with excellent insulation and thinning properties, made of an oxide, nitride or oxynitride of silicon or hafnium. The insulation layer 22 may be epoxy, polyimide, or other resin film that is easier to form. In particular, the insulation layer 22 is preferably made of a material with a low dielectric constant, whereby in the case of presence of the insulation layer 22 between the coil 110 and the external electrodes 121 and 122, it is possible to reduce the stray capacitance formed between the coil 110 and the external electrodes 121 and 122.

The insulation layer 22 can be formed e.g. by stacking resin films such as ABF GX-92 (manufactured by Ajinomoto Fine-Techno Co. Inc.) or by applying and heat curing paste-like resin.

Preferably, a part of the outer surface 100 of the base body 10 is made of a material different from that of the other portions of the outer surface 100. According to the above configuration, the color of the outer surface 100 of the base body 10 can partly change so that e.g. see-through of the internal structure of the base body 10 can be prevented. A part of the outer surface 100 of the base body 10 can be used as a marker so that the inductor component 1 can have a directivity. The different material includes a modified glass portion (modified layer) of the base body 10.

The base body 10 may include a sintered body. That is, the substrate 21 may be a sintered body so that the strength of the base body 10 can be ensured. Also, by using ferrite, etc. for the sintered body, the inductance acquisition efficiency can be enhanced.

<Coil 110>

The coil 110 comprises: a bottom surface wire 11*b* arranged above the bottom surface 21*b* of the substrate 21 and covered with the insulation layer 22; a top surface wire 11*t* arranged above the top surface 21*t* of the substrate 21 and covered with the insulation layer 22; and a pair of through wires 13 and 14 extending through the substrate 21 from the bottom surface 21*b* to the top surface 21*t* and arranged opposite to each other with respect to the axis AX. The bottom surface wire lib, the first through wire 13, the top surface wire 11*t*, and the second through wire 14 are connected in order and constitute at least a part of the coil 110 wound in the axis AX direction.

According to the above configuration, because the coil 110 is the coil 110 with a so-called helical shape, it is possible to reduce the region where the bottom surface wire lib, the top surface wire 11*t*, and the through wires 13 and 14 run in parallel along the winding direction of the coil 110 in a section orthogonal to the axis AX and to thereby decrease the stray capacitance of the coil 110.

As used herein, the helical shape refers to a shape in which the number of turns of the entire coil is greater than one turn, with the number of turns of the coil in a section orthogonal to the axis being less than one turn. One turn or more refers to a state where in a section orthogonal to the axis the coil wiring has a portion running in parallel in the winding direction radially adjacent when viewed from the axial direction. Less than one turn refers to a state where in a section orthogonal to the axis the coil wiring does not have the portion running in parallel in the winding direction radially adjacent when viewed from the axial direction. The portion of the wiring running in parallel encompasses not only an extended portion extending in the winding direction of the wiring but also a pad portion connected to the end of the extended portion and having a larger width than the width of the extended portion.

The top surface wire 11*t* is of a shape extending in Y direction. A plurality of the top surface wires 11*t* are arranged in parallel along X direction. The bottom surface wire 11*b* extends in Y direction with a slight tilt in X detection. A plurality of the bottom surface wires 11*b* are arranged in parallel along X direction.

The first through wire 13 is arranged in the through hole V of the base body 10 toward the first side surface 100*s*1 with respect to the axis AX, while the second through wire 14 is arranged in the through hole V of the base body 10 toward the second side surface 100*s*2 with respect to the axis AX. The first through wire 13 and the second through wire 14 each extend in a direction orthogonal to the bottom surface 21*b* and the top surface 21*t* (bottom surface 100*b* and top surface 100*t*). A plurality of the first through wires 13 are arranged in parallel along X detection and a plurality of the second through wires 14 are arranged in parallel along X detection.

The bottom surface wire 11*b* and the top surface wire 11*t* are made of a good conductive material such as copper, silver, gold, or an alloy thereof. The bottom surface wire 11*b* and the top surface wire 11*t* may be a metal film formed by plating, vapor deposition, sputtering, etc. or may be a sintered metal body made of conductor paste applied and sintered. The bottom surface wire 11*b* and the top surface wire 11*t* each may be of a multi-layer structure in which a plurality of metal layers are stacked. The bottom surface wire 11*b* and the top surface wire 11*t* preferably have a thickness of 5 μm or more and 50 μm or less (i.e., from 5 μm to 50 μm).

The bottom surface wire 11*b* and the top surface wire 11*t* are preferably formed by the semi-additive method, thereby rendering it possible to form the bottom surface wire 11*b* and top surface wire 11*t* with low electrical resistance, high accuracy, and high aspect ratio. For example, the bottom surface wire 11*b* and the top surface wire 11*t* can be formed as follows. First, over the entire outer surface 100 of the individualized base body 10, a titanium layer and a copper layer are formed in the mentioned order by sputtering or electroless plating to form a seed layer, and a patterned photoresist is formed on the seed layer. Next, a copper layer is formed on the seed layer in an opening of the photoresist by electroplating. Subsequently, the photoresist and the seed layer are removed by wet etching or dry etching. As a result, the bottom surface wire 11*b* and top surface wire 11*t* patterned into any shape can be formed on the outer surface 100 of the base body 10.

The first through wire 13 and the second through wire 14 can be formed in the through holes V previously formed in the base body 10, by using the materials and methods exemplified for the bottom surface wire 11*b* and the top surface wire 11*t*.

Preferably, the axis AX of the coil 110 is parallel to the bottom surface 100*b* of the base body 10. According to this, in the case of mounting the inductor component 1 on the mount substrate with the bottom surface 100*b* of the base body 10 facing the mount substrate, it is possible to reduce interference of the mount substrate with the magnetic flux of the coil 110 to improve the inductance acquisition efficiency.

The axis AX of the coil 110 may be perpendicular to X detection, according to which it is possible to reduce interference of the first external electrode 121 and the second external electrode 122 with the magnetic flux of the coil 110 to improve the inductance acquisition efficiency. The axis AX of the coil 110 may be perpendicular to the bottom surface 100*b* of the base body 10, according to which it is possible to reduce interference of the first external electrode 121 and the second external electrode 122 with the magnetic flux of the coil 110 to improve the inductance acquisition efficiency.

<First External Electrode 121 and Second External Electrode 122>

The first external electrode 121 is connected to a first end of the coil 110, while the second external electrode 122 is connected to a second end of the coil 110. The first external electrode 121 and the second external electrode 122 may each be made of a single-layer conductive material or a plural-layer conductive material. In the case of the single-layer conductive material, it is made of e.g. the same material as that of the coil 110, whereas in the case of the plural-layer conductive material, it is composed of e.g. a base layer of the same material as that of the coil 110 and a plating layer covering the base layer.

Figure 4A:
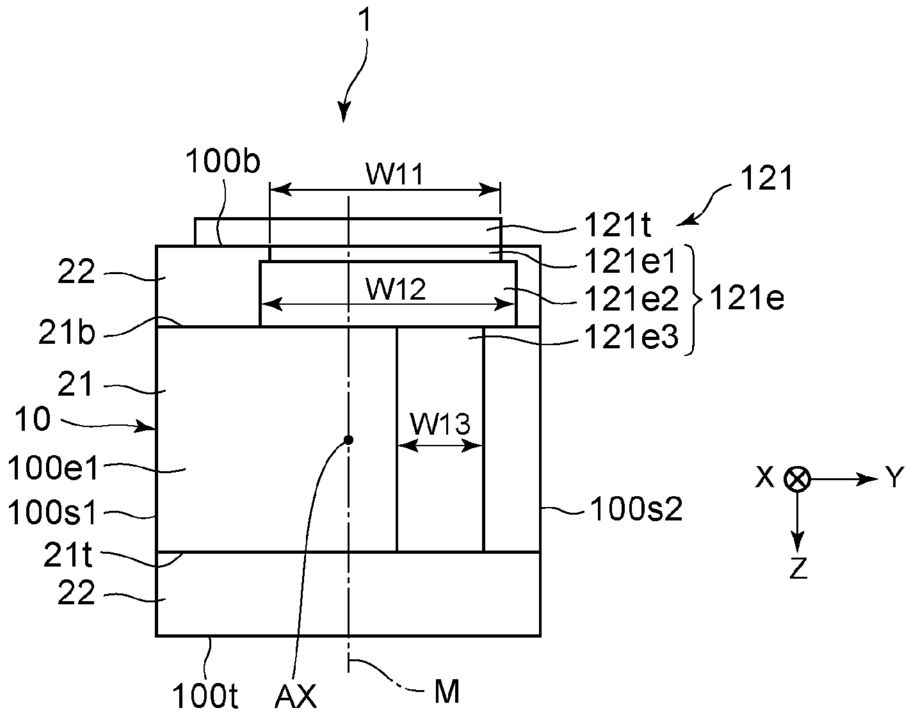
FIG. 4A is a schematic end view of the inductor component seen from the first end surface side.

FIG. 4A is a schematic end view of the inductor component 1 seen from the first end surface 100*e*1 side. As shown in FIGS. 1, 2 and 4A, the first external electrode 121 is disposed continuous with the first end surface 100*e*1 and the bottom surface 100*b*. According to the above configuration, the first external electrode 121 is a so-called L-shaped electrode, so that solder fillet can be formed on the first external electrode 121 when mounting the inductor component 1 on the mount substrate. As a result, the inductor component 1 can have improved mounting strength and more stabilized mounting attitude.

The first external electrode 121 includes a first end surface portion 121*e* disposed on the first end surface 100*e*1 and a first bottom surface portion 121*t* disposed on the bottom surface 100*b*. The first end surface portion 121*e* and the first bottom surface portion 121*t* are in connection. The first end surface portion 121*e* is embedded in the first end surface 100*e*1 in such a manner as to be exposed from the first end surface 100*e*1. The first bottom surface portion 121*t* is arranged on the bottom surface 100*b* in such a manner as to be raised from the bottom surface 100*b*. The first end surface portion 121*e* is connected to the second through wire 14 of the coil 110.

As shown in FIG. 4A, when viewed from the first end surface 100*e*1 side in X direction, the first end surface portion 121*e* of the first external electrode 121 lies on the same side as the second through wire 14 lies, to which the first external electrode 121 is connected, with respect to the center M in Y direction of the base body 10. In short, the first end surface portion 121*e* lies toward the second side surface 100*s*2 with respect to the center M. As used herein, lying on the same side encompasses not only all of the first end surface portion 121*e* lying on the same side as the second through wire 14 lies with respect to the center M, but also one half or more of the first end surface portion 121*e* lying on the same side as the second through wire 14 lies with respect to the center M. In this embodiment, the center M intersects the axis AX.

The above configuration can shorten the length of the extended portion extending from the first end surface portion 121*e* of the first external electrode 121 up to the second through wire 14, thereby rendering it possible to reduce the size of the first external electrode 121 and to decrease the stray capacitance between the coil 110 and the first external electrode 121.

As shown in FIG. 4A, when viewed from the first end surface 100*e*1 side in X direction, the first end surface portion 121*e* of the first external electrode 121 includes along Z direction three or more regions each having a different Y-direction dimension. Between two regions adjacent in Z direction, the Y-direction dimension of one region differs stepwise from the Y-direction dimension of the other region. According to the above configuration, the first external electrode 121 can have an optimized shape so that the amount of solder fillet can be controlled.

Specifically, the first end surface portion 121*e* includes a first portion 121*e*1, a second portion 121*e*2, and a third portion 121*e*3 that are connected in order along Z direction. The first portion 121*e*1 is connected on the bottom surface 100*b* to the first bottom surface portion 121*t*. The second portion 121*e*2 is connected within the base body 10 to the second through wire 14. When viewed from the first end surface 100*e*1 side in X direction, the first portion 121*e*1, the second portion 121*e*2, and the third portion 121*e*3 correspond to the above regions, respectively.

When viewed from the first end surface 100*e*1 side in X direction, there are mutual differences among the Y-direction dimension (hereinafter, referred to as first width W11) of the first portion 121*e*1, the Y-direction dimension (hereinafter, referred to as second width W12) of the second portion 121*e*2, and the Y-direction dimension (hereinafter, referred to as third width W13) of the third portion 121*e*3.

When viewed from the first end surface 100*e*1 side in X direction, the first portion 121*e*1, the second portion 121*e*2, and the third portion 121*e*3 are each rectangular. That is, the first width W11 is constant along Z direction of the first portion 121*e*1, the second width W12 is constant along Z direction of the second portion 121*e*2, and the third width W13 is constant along Z direction of the third portion 121*e*3. In cases where e.g. the first portion 121*e*1 has a Y-direction dimension differing along Z direction of the first portion 121*e*1, the first width W11 is a maximum value in Y direction of the first portion 121*e*1.

As shown in FIG. 4A, among the Y-direction dimensions of the three or more regions of the first end surface portion 121*e*, their magnitude relations alternately change along Z direction. According to the above configuration, by taking into consideration the processing deviation occurring when forming the regions through stacking, the positional offset can be prevented between the regions, enabling electrical connections between the regions to be ensured.

Specifically, the first width W11 is smaller than the second width W12, and the second width W12 is larger than the third width W13. That is, the first width W11, the second width W12, and the third width W13 change from small to large, and then to small. For example, the first width W11 is 0.12 mm, the second width W12 is 0.132 mm, and the third width W13 is 0.05 mm. Furthermore, the first bottom surface portion 121*t* has a Y-direction dimension larger than that of the first width W11. At this time, the first bottom surface portion 121*t*, the first portion 121*e*1, the second portion 121*e*2, and the third portion 121*e*3 alternately change along Z direction in the magnitude relations in Y direction.

As shown in FIG. 4A, the first end surface portion 121*e* of the first external electrode 121 does not overlap the axis AX. The above configuration can reduce interference of the first end surface portion 121*e* with the magnetic flux of the coil 110, achieving improvement in the inductance acquisition efficiency.

Preferably, when viewed from the axis AX direction of the coil 110, the first end surface portion 121*e* does not overlap an inner diameter part of the coil 110. The above configuration can reduce interference of the first end surface portion 121*e* with the magnetic flux of the coil 110, achieving improvement in the inductance acquisition efficiency.

As shown in FIG. 4A, the Z-direction dimension of the first end surface portion 121*e* of the first external electrode 121 is one-half or more of the Z-direction dimension of the base body 10, more preferably two-thirds or more of the Z-direction dimension of the base body 10. The above configuration can improve the mounting strength via the solder fillet of the first external electrode 121.

Preferably, at least a part of the first end surface portion 121*e* of the first external electrode 121 is raised from the first end surface 100*e*1. According to the above configuration, the first external electrode 121 can have improved mountability. Also, at the time of characteristic selection in the subsequent process, electrical characteristics can easily be acquired.

Figure 4B:
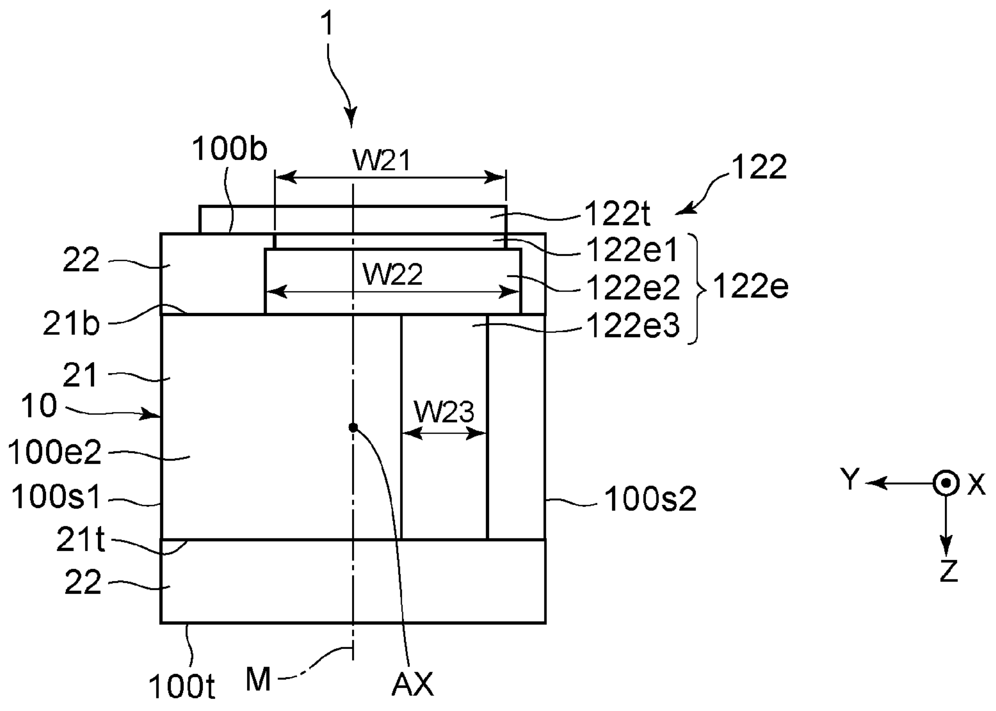
FIG. 4B is a schematic end view of the inductor component seen from a second end surface side.

FIG. 4B is a schematic end view of the inductor component 1 seen from the second end surface 100*e*2 side. The second external electrode 122 has the same configuration as that of the first external electrode 121. Therefore, hereinafter, descriptions will be given without describing similar detailed portions.

As shown in FIGS. 1, 2, and 4B, the second external electrode 122 is disposed continuous with the second end surface 100*e*2 and the bottom surface 100*b*. According to the above configuration, the second external electrode 122 is a so-called L-shaped electrode, so that solder fillet can be formed on the second external electrode 122 when mounting the inductor component 1 on the mount substrate. As a result, the inductor component 1 can have improved mounting strength and more stabilized mounting attitude.

The second external electrode 122 includes a second end surface portion 122*e* disposed on the second end surface 100*e*2 and a second bottom surface portion 122*t* disposed on the bottom surface 100*b*. The second end surface 100*e*2 and the second bottom surface portion 122*t* are in connection. The second end surface portion 122*e* is connected to the first through wire 13 of the coil 110.

As shown in FIG. 4B, when viewed from the second end surface 100*e*2 side in X direction, the second end surface portion 122*e* of the second external electrode 122 lies on the same side as the first through wire 13 lies, to which the second external electrode 122 is connected, with respect to the center M in Y direction of the base body 10. In short, the second end surface portion 122*e* lies toward the first side surface 100*s*1 with respect to the center M. The above configuration can shorten the length of the extended portion extending from the second end surface portion 122*e* of the second external electrode 122 up to the first through wire 13, thereby rendering it possible to reduce the size of the second external electrode 122 and to decrease the stray capacitance between the coil 110 and the second external electrode 122.

As shown in FIG. 4B, when viewed from the second end surface 100*e*2 side in X direction, the second end surface portion 122*e* of the second external electrode 122 includes along Z direction three or more regions each having a different Y-direction dimension. Between two regions adjacent in Z direction, the Y-direction dimension of one region differs stepwise from the Y-direction dimension of the other region. According to the above configuration, the second external electrode 122 can have an optimized shape so that the amount of solder fillet can be controlled.

Specifically, the second end surface portion 122*e* includes a first portion 122*e*1, a second portion 122*e*2, and a third portion 122*e*3 that are connected in order along Z direction. The first portion 122*e*1 is connected on the bottom surface 100*b* to the second bottom surface portion 122*t*. The second portion 122*e*2 is connected within the base body 10 to the first through wire 13.

When viewed from the second end surface 100*e*2 side in X direction, there are mutual differences among the Y-direction dimension (hereinafter, referred to as first width W21) of the first portion 122*e*1, the Y-direction dimension (hereinafter, referred to as second width W22) of the second portion 122*e*2, and the Y-direction dimension (hereinafter, referred to as third width W23) of the third portion 122*e*3.

As shown in FIG. 4B, among the Y-direction dimensions of the three or more regions of the second end surface portion 122*e*, their magnitude relations alternately change along Z direction. According to the above configuration, by taking into consideration the processing deviation occurring when forming the regions through stacking, the positional offset can be prevented between the regions, enabling electrical connections between the regions to be ensured.

Specifically, the first width W21 is smaller than the second width W22, and the second width W22 is larger than the third width W23. That is, the first width W21, the second width W22, and the third width W23 change from small to large, and then to small. For example, the first width W21 is 0.12 mm, the second width W22 is 0.132 mm, and the third width W23 is 0.05 mm. Furthermore, the second bottom surface portion 122*t* has a Y-direction dimension larger than that of the first width W21. At this time, the second bottom surface portion 122*t*, the first portion 122*e*1, the second portion 122_e_2, and the third portion 122_e_3 alternately change along Z direction in the magnitude relations in Y direction.

As shown in FIG. 4B, the second end surface portion 122_e_ of the second external electrode 122 does not overlap the axis AX. The above configuration can reduce interference of the second end surface portion 122_e_ with the magnetic flux of the coil 110, achieving improvement in the inductance acquisition efficiency.

Preferably, when viewed from the axis AX direction of the coil 110, the second end surface portion 122_e_ does not overlap the inner diameter part of the coil 110. The above configuration can reduce interference of the second end surface portion 122_e_ with the magnetic flux of the coil 110, achieving improvement in the inductance acquisition efficiency.

As shown in FIG. 4B, the Z-direction dimension of the second end surface portion 122_e_ of the second external electrode 122 is one-half or more of the Z-direction dimension of the base body 10, more preferably two-thirds or more of the Z-direction dimension of the base body 10. The above configuration can improve the mounting strength via the solder fillet of the second external electrode 122.

Preferably, at least a part of the second end surface portion 122_e_ of the second external electrode 122 is raised from the second end surface 100_e_2. According to the above configuration, the second external electrode 122 can have improved mountability. Also, at the time of characteristic selection in the subsequent process, electrical characteristics can easily be acquired.

As shown in FIG. 3, preferably, when viewed from the first end surface 100_e_1 side in X direction, the area of the portion (the area of the region hatched by solid lines of FIG. 3) of the first external electrode 121 exposed from the outer surface 100 of the base body 10 is equal to the area of the portion (the area of the region hatched by broken lines of FIG. 3) of the second external electrode 122 exposed from the outer surface 100 of the base body 10. According to the above configuration, the first external electrode 121 and the second external electrode 122 each use the same amount of solder in mounting the inductor component 1, so that the inductor component 1 can have more stabilized attitude.

Preferably, when viewed from Z direction, the first external electrode 121 and the second external electrode 122 do not overlap the coil 110. Specifically, referring to FIG. 2, in the first external electrode 121, the second portion 121_e_2 of the first end surface portion 121_e_ is extended in X direction and connected to the second through wire 14 at a position not overlapping the first bottom surface portion 121_t_, whereby the first external electrode 121 cannot overlap the coil 110. The same applies to the second external electrode 122. The above configuration can decrease the stray capacitance between the coil 110 and the first external electrode 121 and between the coil 110 and the second external electrode 122.

Figure 5:
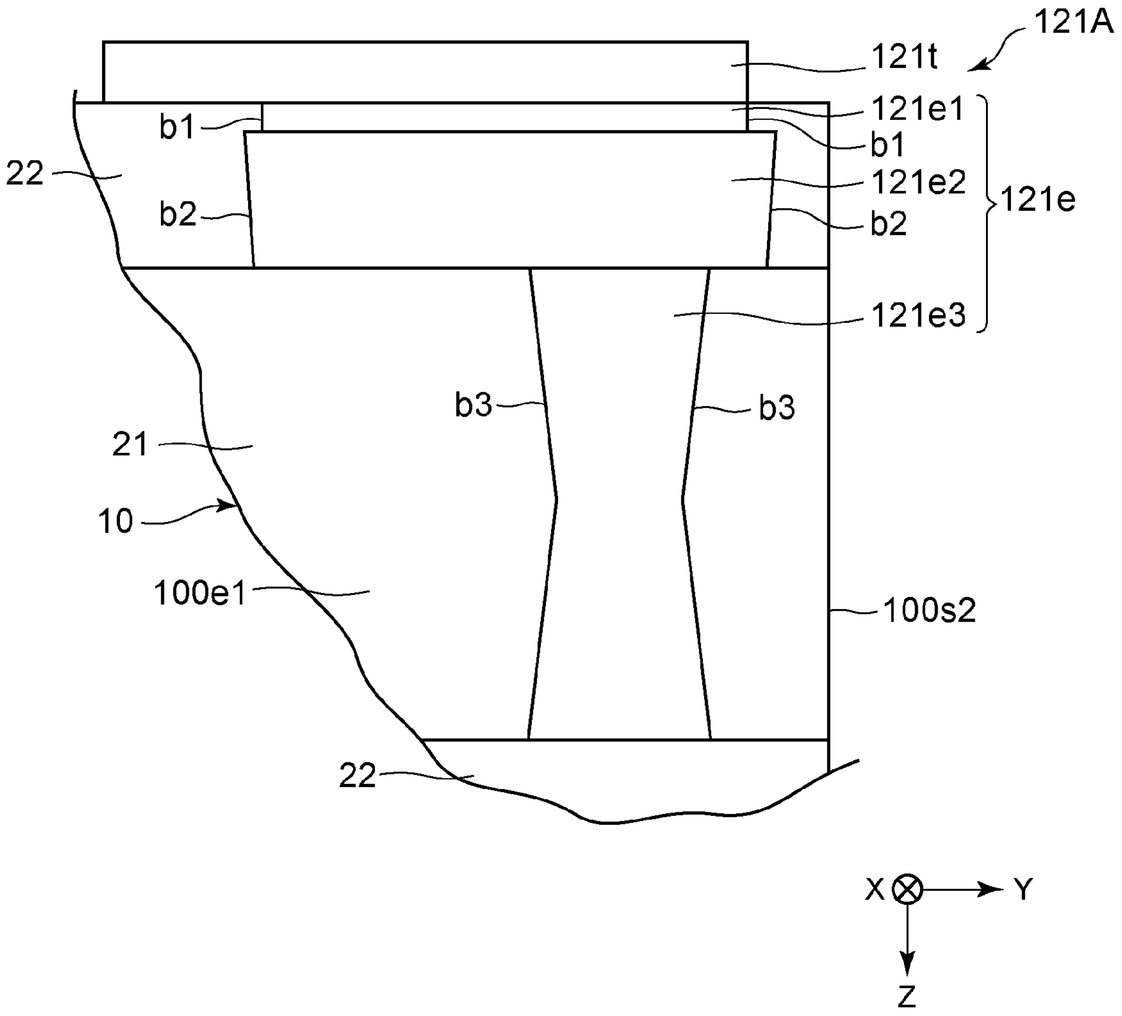
FIG. 5 is a schematic view of a variant of a first external electrode seen from the first end surface side.

FIG. 5 is a schematic view of a variant of a first external electrode 121A seen from the first end surface 100_e_1 side. As shown in FIG. 5, the three regions of the first end surface portion 121_e_ of the first external electrode 121A each have side edges at both ends in Y direction. The tilt angle of the side edges relative to Z direction differs among all the regions when viewed from X detection.

Specifically, when viewed from the first end surface 100_e_1 side in X direction, the first portion 121_e_1 has at its both ends a first side edge b1, the second portion 121_e_2 has at its both ends a second side edge b2, and the third portion 121_e_3 has at its both ends a third side edge b3. When viewed from X direction, there are mutual differences among the tilt angle of the first side edge b1 relative to Z direction, the tilt angle of the second side edge b2 relative to Z direction, and the tilt angle of the third side edge b3 relative to Z direction. The tilt angles of the first side edge b1, the second side edge b2, and the third side edge b3 increase in ascending order. The shape defined by both the third side edges b3 is constricted in the middle in Z direction.

According to the above configuration, by taking into consideration the processing deviation occurring when forming the regions (the first to third portions 121_e_1 to 121_e_3) through stacking, the positional offset can be prevented between the regions, enabling electrical connections between the regions to be ensured. The second external electrode 122 may have the same configuration and operational effects as those of the first external electrode 121A.

<Center-of-Gravity Position of Area of First External Electrode 121 and Center-of-Gravity Position of Area of Second External Electrode 122>

Description will be given of how to find the center-of-gravity position of the area of the first external electrode 121 when viewed from the first end surface 100_e_1 side in X direction as shown in FIG. 4.

The center-of-gravity position of the area of the first external electrode 121 refers to a center position of the area of the first external electrode 121 distributed in Y direction of the base body 10, when viewed from the first end surface 100_e_1 side in X direction of the base body 10.

Specifically, when viewed from the first end surface 100_e_1 side in X direction, the first external electrode 121 includes four figures, i.e. the first bottom surface portion 121, the first portion 121_e_1 of the first end surface portion 121_e_, the second portion 121_e_2 of the first end surface portion 121_e_, and the third portion 121_e_3 of the first end surface portion 121_e_.

A center-of-gravity position X of the area of the first external electrode 121 is found from $$X=(St\times Xt+Se1\times Xe1+Se2\times Xe2+Se3\times Xe3)/(St+Se1+Se2+Se3)$$

where: St is the area of the first bottom surface portion 121_t_ and Xt is the center-of-gravity position of the first bottom surface portion 121_t_ in Y direction; Se1 is the area of the first portion 121_e_1 and Xe1 is the center-of-gravity position of the first portion 121_e_1 in Y direction; Se2 is the area of the second portion 121_e_2 and Xe2 is the center-of-gravity position of the second portion 121_e_2 in Y direction; and Se3 is the area of the third portion 121_e_3 and Xe3 is the center-of-gravity position of the third portion 121_e_3 in Y direction.

The center-of-gravity position of the area of the second external electrode 122 is found in the same manner as in the case of the first external electrode 121, of which description will be omitted.

The center-of-gravity position of the area of the first external electrode 121 and the center-of-gravity position of the area of the second external electrode 122 found as above are opposite to each other with respect to the center M when viewed from the first end surface 100_e_1 side in X direction, as shown in FIG. 3. That is, the center-of-gravity position of the area of the first external electrode 121 lies toward the second side surface 100_s_2 with respect to the center M, whereas the center-of-gravity position of the area of the second external electrode 122 lies toward the first side surface 100_s_1 with respect to the center M.

<Method of Fabricating Inductor Component 1>

Referring then to FIGS. 6A to 6H, a method of fabricating the inductor component 1 will be described. FIGS. 6A to 6H are views corresponding to a section A-A of FIG. 2.

Figure 6A:
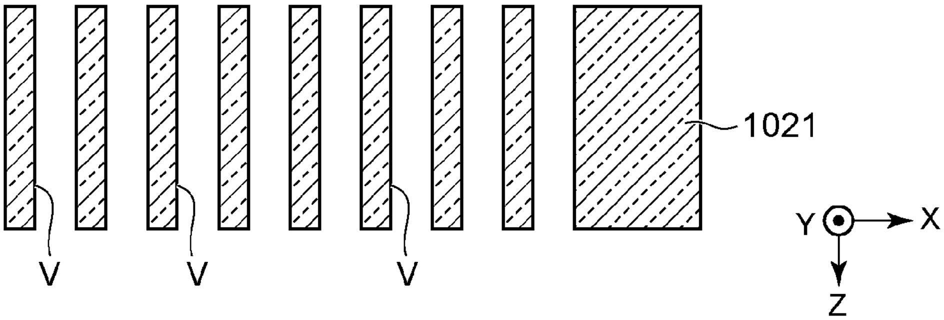
FIG. 6A is a schematic section view illustrating a method of fabricating the inductor component.

As shown in FIG. 6A, a glass substrate 1021 to be the substrate 21 is prepared. The glass substrate 1021 is a single-layer glass plate. A plurality of through holes V are disposed on the glass substrate 1021 at predetermined positions. Although at this time the glass substrate 1021 is opened by laser processing, it may be opened by dry or wet etching or by machining such as drilling.

Figure 6B:
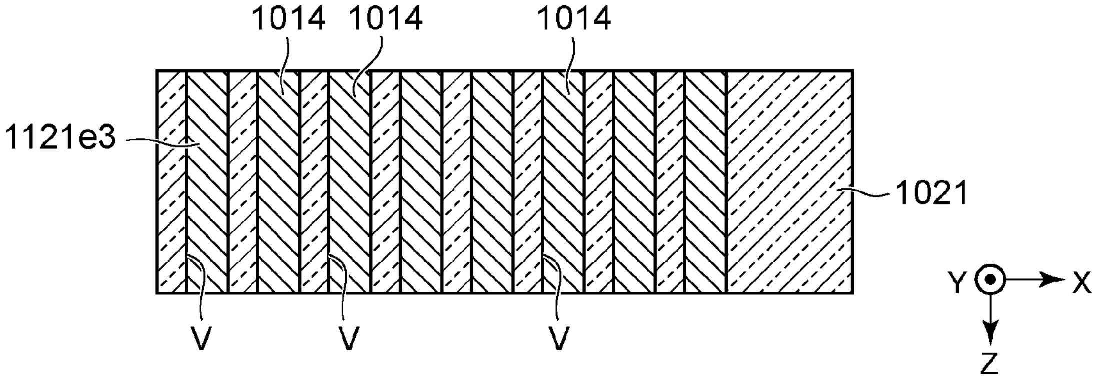
FIG. 6B is a schematic section view illustrating the method of fabricating the inductor component.

As shown in FIG. 6B, a seed layer not shown is disposed over the entire surface of the glass substrate 1021 and a copper layer is formed on the seed layer by electroplating. The seed layer and the copper layer on the top surface and the bottom surface of the glass substrate 1021 are removed by wet etching or dry etching. Through conductor layers 1014 to be the second through wires 14 are thereby formed in the through holes V of the glass substrate 1021. A third base layer 1121*e*3 is formed that constitutes a base of the third portion 121*e*3 of the first end surface portion 121*e*. At this time, although not shown, similarly, through conductor layers to be the first through wires 13 are formed in the through holes V, and a third base layer is formed that constitutes a base of the third portion 122*e*3 of the second end surface portion 122*e*.

Figure 6C:
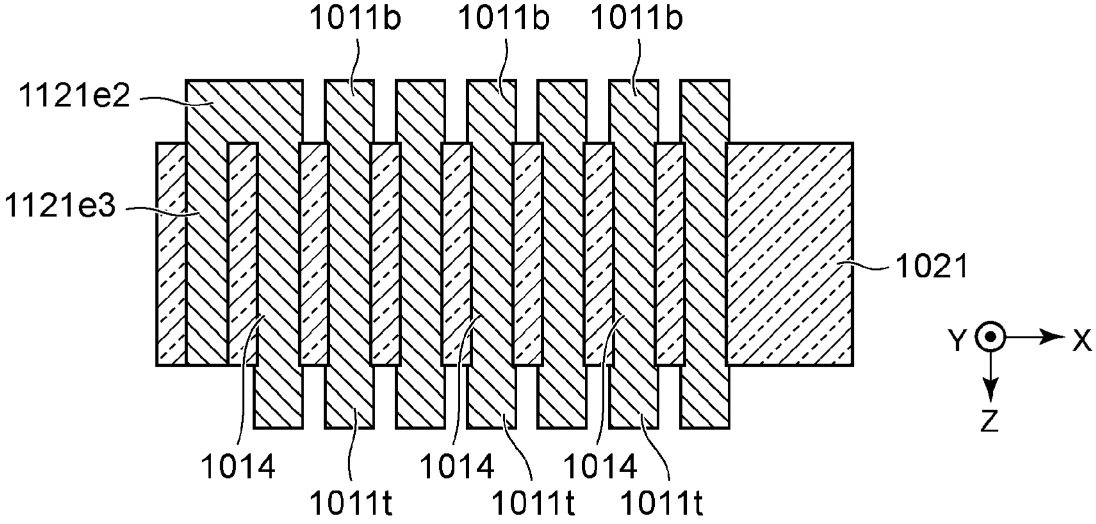
FIG. 6C is a schematic section view illustrating the method of fabricating the inductor component.

As shown in FIG. 6C, a seed layer not shown is disposed over the entire surface of the glass substrate 1021 and a patterned photoresist is formed on the seed layer. A copper layer is then formed on the seed layer in an opening of the photoresist by electroplating. Subsequently, the photoresist and the seed layer are removed by wet etching or dry etching. A bottom surface conductor layer 1011*b* as the bottom surface wire 11*b* and a top surface conductor layer 1011*t* as the top surface wire 11*t*, patterned into any shape, are thereby formed. A second base layer 1121*e*2 is formed that constitutes a base of the second portion 121*e*2 of the first end surface portion 121*e*. At this time, although not shown, similarly, a second base layer is formed that constitutes a base of the second portion 122*e*2 of the second end surface portion 122*e*.

In FIG. 6B, the bottom surface conductor layer 1011*b* and the top surface conductor layer 1011*t* may be formed without removing the copper layer. In that case, the shapes of upper surfaces of the bottom surface conductor layer 1011*b* and the top surface conductor layer 1011*t* corresponding to the through holes V are concaved.

Figure 6D:
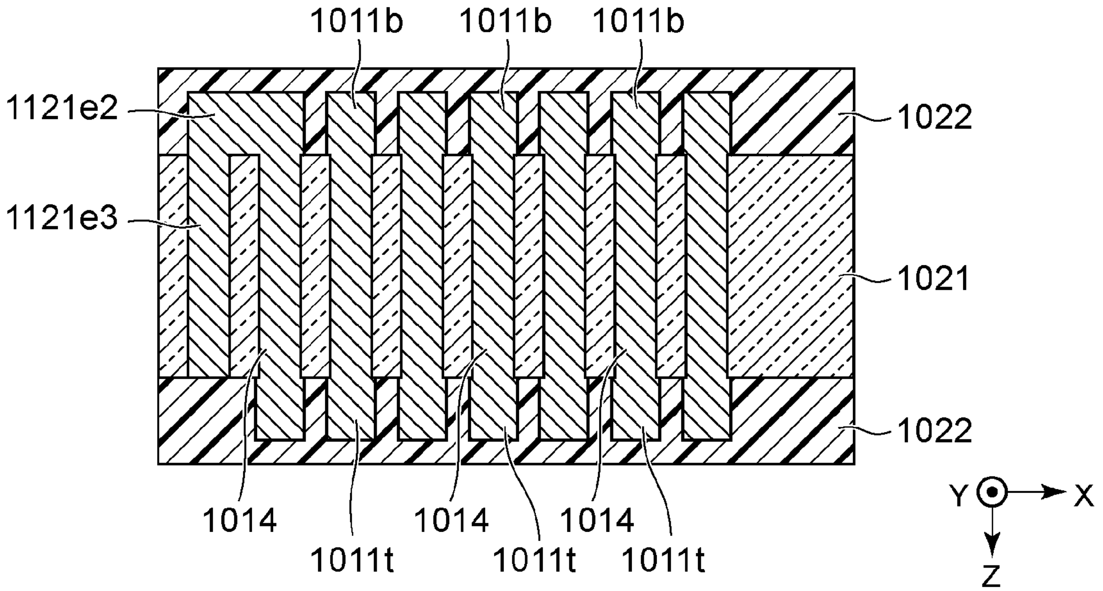
FIG. 6D is a schematic section view illustrating the method of fabricating the inductor component.
Figure 6E:
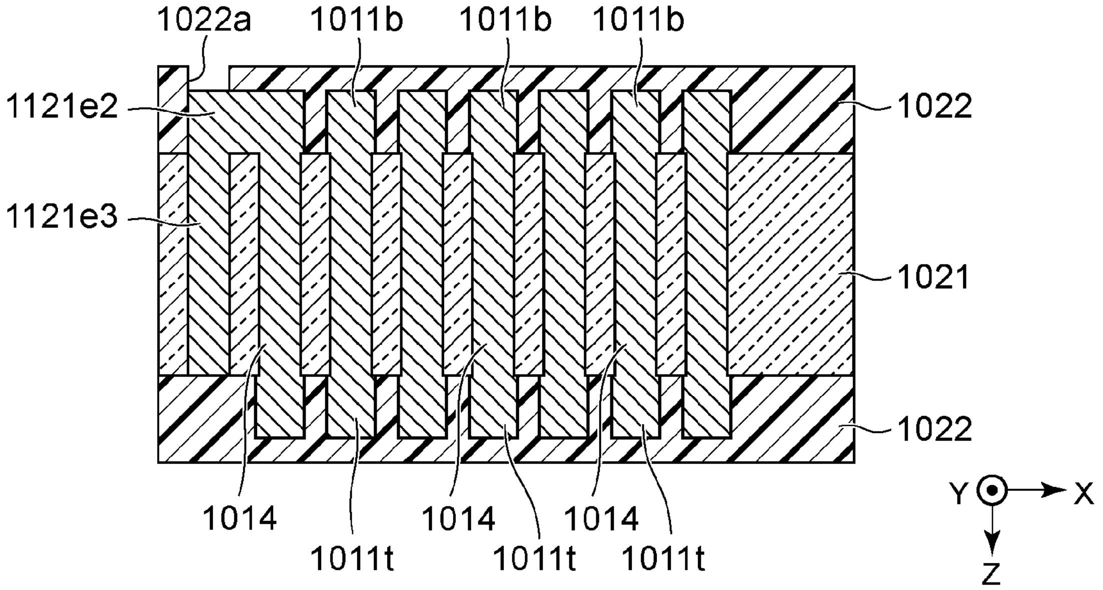
FIG. 6E is a schematic section view illustrating the method of fabricating the inductor component.

As shown in FIG. 6D, an insulating resin layer 1022 to be the insulation layer 22 is applied and cured on the top surface and the bottom surface of the glass substrate 1021 so as to cover the conductor layer. As shown in FIG. 6E, a hole 1022*a* is disposed on the second base layer 1121*e*2 of the insulating resin layer 1022 on the bottom surface side using laser processing.

Figure 6F:
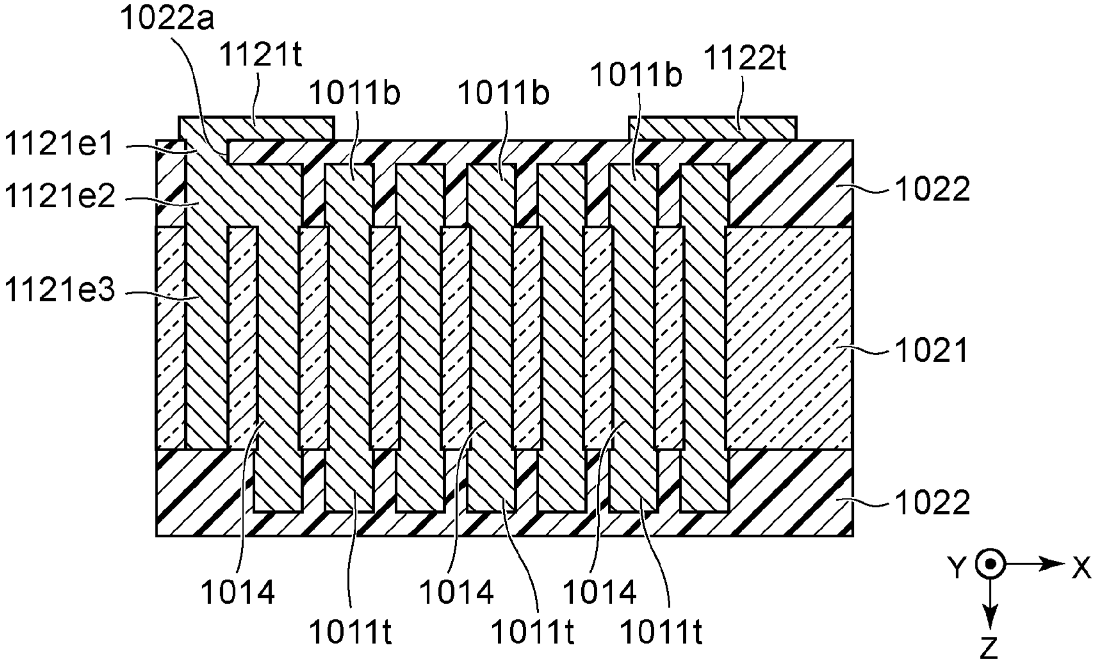
FIG. 6F is a schematic section view illustrating the method of fabricating the inductor component.

As shown in FIG. 6F, a seed layer not shown is disposed on the insulating resin layer 1022 on the bottom surface side and a patterned photoresist is formed on the seed layer. A copper layer is then formed on the seed layer in an opening of the photoresist by electroplating. Subsequently, the photoresist and the seed layer are removed by wet etching or dry etching. A first bottom surface base layer 1121*t* as a base of the first bottom surface portion 121*t* and a second bottom surface base layer 1122*t* as a base of the second bottom surface portion 122*t*, patterned into any shape, are thereby formed. A first base layer 1121*e*1 as a base of the first portion 121*e*1 of the first end surface portion 121*e* is formed in the hole 1022*a*. At this time, although not shown, similarly, a first base layer as a base of the first portion 122*e*1 of the second end surface portion 122*e* is formed in a hole of the insulating resin layer 1022 on the bottom surface side.

Figure 6G:
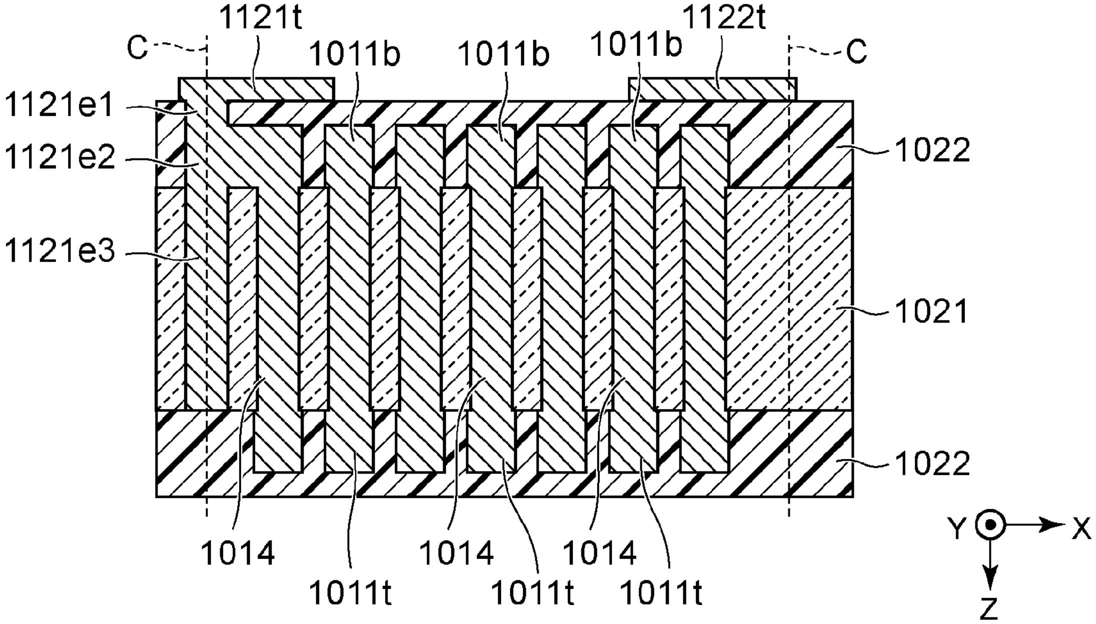
FIG. 6G is a schematic section view illustrating the method of fabricating the inductor component.
Figure 6H:
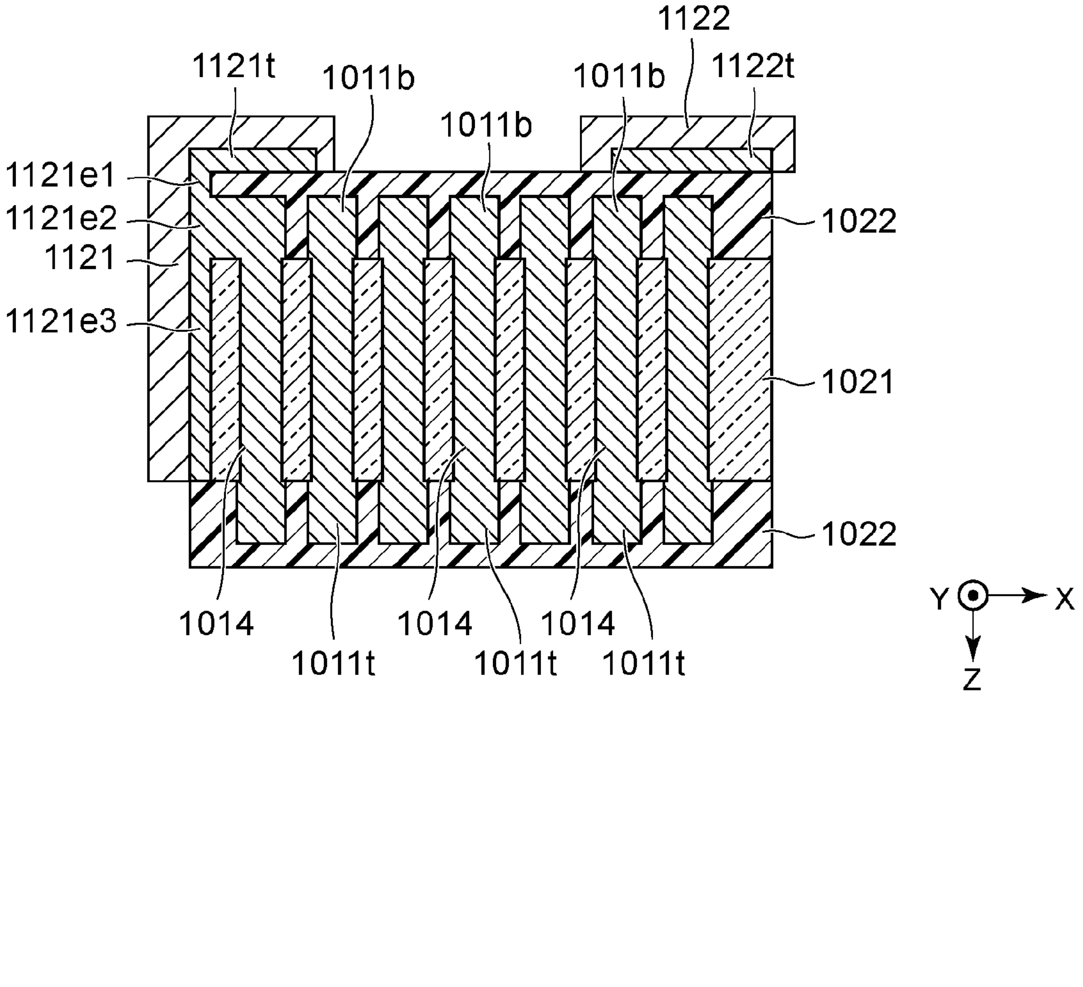
FIG. 6H is a schematic section view illustrating the method of fabricating the inductor component.

The base body 10 is individualized at cut lines C as shown in FIG. 6G, and plating layers 1121 and 1122 are formed by barrel plating as shown in FIG. 6H. That is, the first external electrode 121 is formed by covering the first bottom surface base layer 1121*t*, the first base layer 1121*e*1, the second base layer 1121*e*2, and the third base layer 1121*e*3 with the plating layer 1121. The second external electrode 122 is formed by covering the second bottom surface base layer 1122*t* and the first base layer, second base layer, and third base layer connected to the second bottom surface base layer 1122*t* with the plating layer 1122. The inductor component 1 is thus fabricated.

The plating layers 1121 and 1122 are each composed of e.g. two layers of Ni/Si. The plating layers 1121 and 1122 may each be composed of e.g. a plurality of layers of Cu/Ni/Au or Cu/Ni/Pd/Au. The external electrodes may include only the base layers without the plating layers. Optimum materials may appropriately be selected in view of rust prevention, solder wettability, electromigration resistance, etc.

Although in the above fabrication method the glass substrate is used as the base body, a sintered material may be used for the base body. In this case, one or less turn of inductor wiring is formed from conductive paste by printing. A material with good conductivity such as Ag or Cu is selected as the conductive paste. Although the copper layer is removed by wet etching or dry etching, CMP processing or machining may be used in removing the copper layer. Although when forming through conductor layers to be the through wires in the through holes V, all are formed by plating, voids may be filled with conductive resin after partial plating.

Insulating paste of glass, ferrite or the like is then printed, which is repeated. Openings that open to connecting portions of the inductor wiring are formed in the insulating paste, and conductive paste is filled into the openings, to thereby achieve electrical connection of the connecting portions of the inductor wiring among the layers.

Subsequently, the insulating paste is sintered by heat treatment at high temperature, and then the base body 10 is individualized, after which the external terminals are formed to fabricate the inductor component. By using a highly insulating paste such glass paste, there can be obtained an inductor component having high Q even at high frequencies. Use of ferrite for the insulating paste enables obtainment of an inductor component with high inductance.

3. Variants

<First Variant>

Figure 7A:
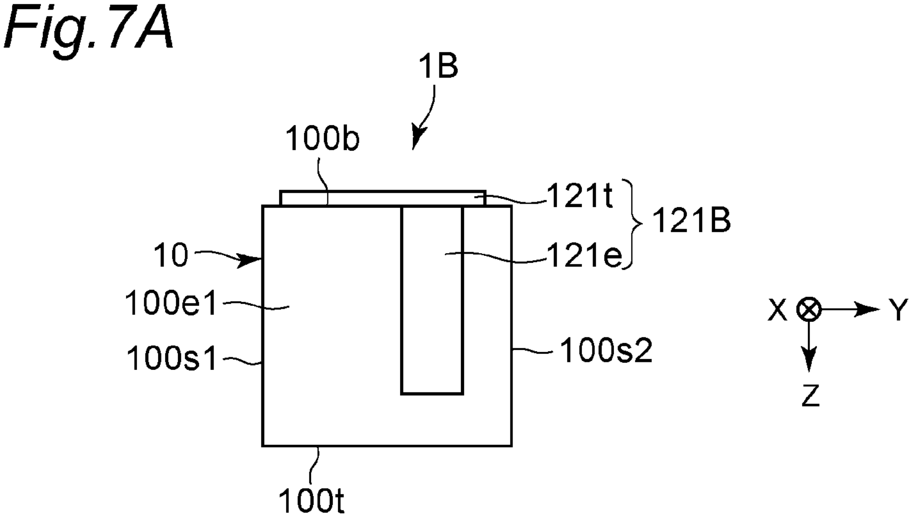
FIG. 7A is a schematic end view showing a first variant of the inductor component seen from the first end surface side.
Figure 7B:
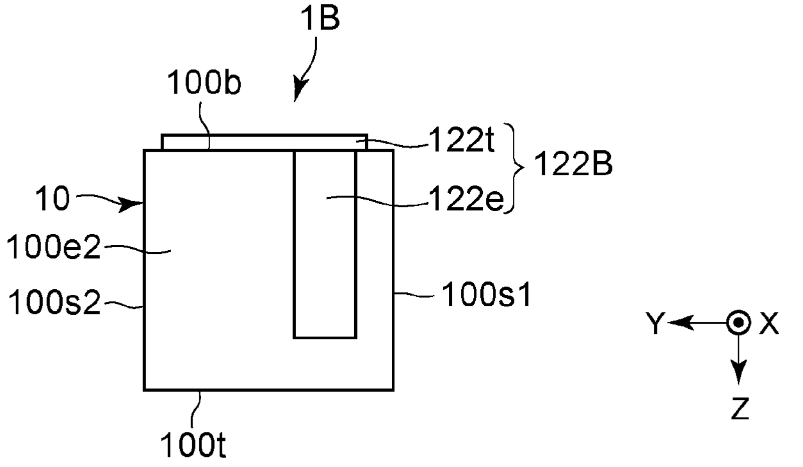
FIG. 7B is a schematic end view showing the first variant of the inductor component seen from the second end surface side.
Figure 7C:
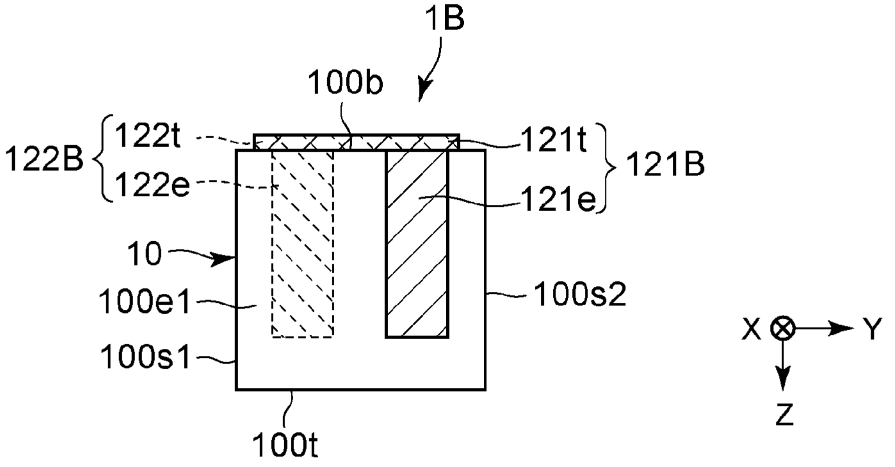
FIG. 7C is a schematic end view showing the first variant of the inductor component seen from the first end surface side.

FIG. 7A is a schematic end view showing a first variant of an inductor component seen from the first end surface 100*e*1 side. FIG. 7B is a schematic end view showing the first variant of the inductor component seen from the second end surface 100*e*2 side. FIG. 7C is a schematic end view showing the first variant of the inductor component seen from the first end surface 100*e*1 side.

As shown in FIG. 7A, in an inductor component 1B of a first variant, a first external electrode 121B includes the first bottom surface portion 121*t* and the first end surface portion 121*e*. The first bottom surface portion 121*t* has the same configuration as that of the first bottom surface portion 121*t* shown in FIG. 4A. Dissimilar from the first end surface portion 121*e* shown in FIG. 4A, the first end surface portion 121*e* includes one region whose Y-direction dimension is constant along Z direction when viewed from the first end surface 100*e*1 side. In other words, the first end surface portion 121*e* is in the shape of a rectangle when viewed from the first end surface 100*e*1 side.

As shown in FIG. 7B, in the inductor component 1B of the first variant, a second external electrode 122B includes the second bottom surface portion 122*t* and the second end surface portion 122*e*. The second bottom surface portion 122*t* has the same configuration as that of the second bottom surface portion 122*t* shown in FIG. 4B. Dissimilar from the second end surface portion 122*e* shown in FIG. 4B, the second end surface portion 122*e* includes one region whose Y-direction dimension is constant along Z direction when viewed from the second end surface 100*e*2 side. In other words, the second end surface portion 122*e* is in the shape of a rectangle when viewed from the second end surface 100*e*2 side.

As shown in FIG. 7C, in the inductor component 1B of the first variant, the first end surface portion 121*e* of the first external electrode 121B and the second end surface portion 122*e* of the second external electrode 122B do not overlap each other when viewed from the first end surface 100*e*1 side in X direction. On the other hand, the first bottom surface portion 121*t* of the first external electrode 121B and the second bottom surface portion 122*t* of the second external electrode 122B overlap completely with each other when viewed from the first end surface 100*e*1 side. In FIG. 7C, for convenience, the exposed portion of the first external electrode 121 is hatched by solid lines, whereas the exposed portion of the second external electrode 122 is hatched by broken lines.

According to the above configuration, because the first end surface portion 121*e* and the second end surface portion 122*e* do not overlap each other when viewed from the first end surface 100*e*1 side in X direction, the first external electrode 121 and the second external electrode 122 can further be reduced in size so that the stray capacitance can further be decreased between the coil 110 and the first external electrode 121 and between the coil and the second external electrode 122. At least one of the first external electrode 121 and the second external electrode 122 may not be formed, and in this case as well, the first end surface portion 121*e* and the second end surface portion 122*e* do not overlap each other.

<Second Variant>

Figure 8A:
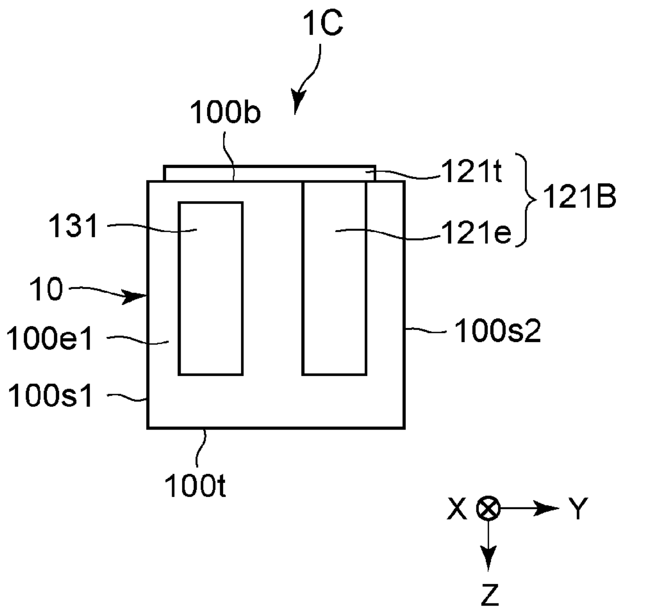
FIG. 8A is a schematic end view showing a second variant of the inductor component seen from the first end surface side.
Figure 8B:
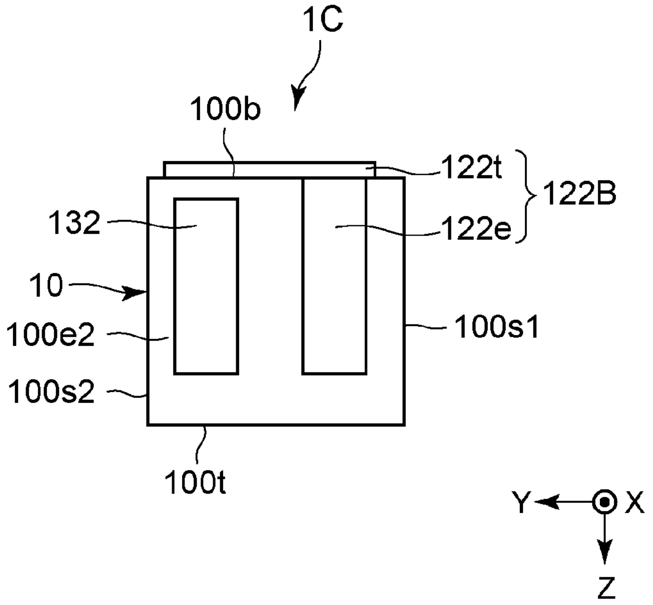
FIG. 8B is a schematic end view showing the second variant of the inductor component seen from the second end surface side.

FIG. 8A is a schematic end view showing a second variant of an inductor component seen from the first end surface 100*e*1 side. FIG. 8B is a schematic end view showing the second variant of the inductor component seen from the second end surface side.

As shown in FIGS. 8A and 8B, an inductor component 1C of the second variant differs from the inductor component 1B of the first variant in that it comprises dummy terminals 131 and 132. The dummy terminals 131 and 132 are disposed on the base body 10 but are not electrically connected to the coil 110. According to the above configuration, solder fillet can be formed on the dummy terminals 131 and 132 to enable further improvement in the mounting strength of the inductor component 1C.

Specifically, as shown in FIG. 8A, the first dummy terminal 131 is disposed on the first end surface 100*e*1 of the base body 10. The first dummy terminal 131 is of the same shape as that of the first end surface portion 121*e* and is arranged parallel to the first end surface portion 121*e*. The first dummy terminal 131 is not connected to the first external electrode 121B, and the first external electrode 121B does not include the first dummy terminal 131.

As shown in FIG. 8B, the second dummy terminal 132 is disposed on the second end surface 100*e*2 of the base body 10. The second dummy terminal 132 is of the same shape as that of the second end surface portion 122*e* and is arranged parallel to the second end surface portion 122*e*. The second dummy terminal 132 is not connected to the second external electrode 122B, and the second external electrode 122B does not include the second dummy terminal 132.

<Third Variant>

Figure 9A:
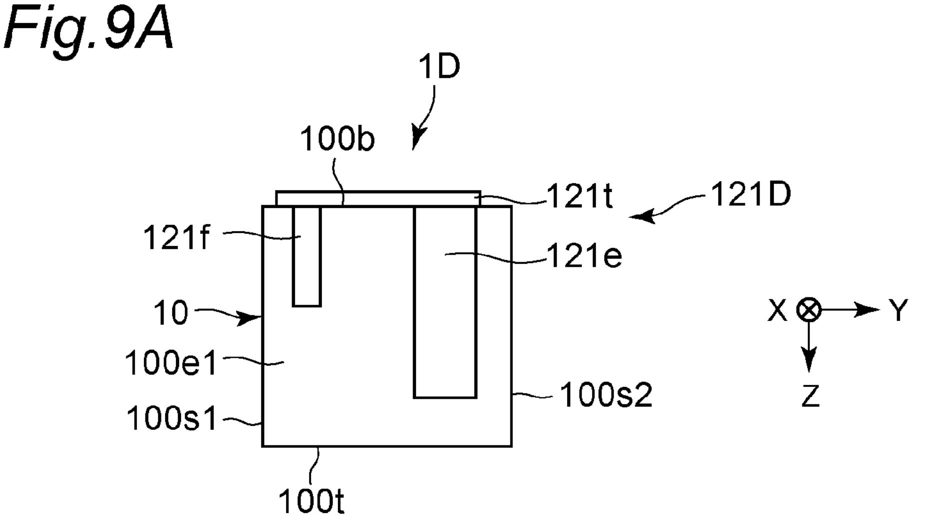
FIG. 9A is a schematic end view showing a third variant of the inductor component seen from the first end surface side.
Figure 9B:
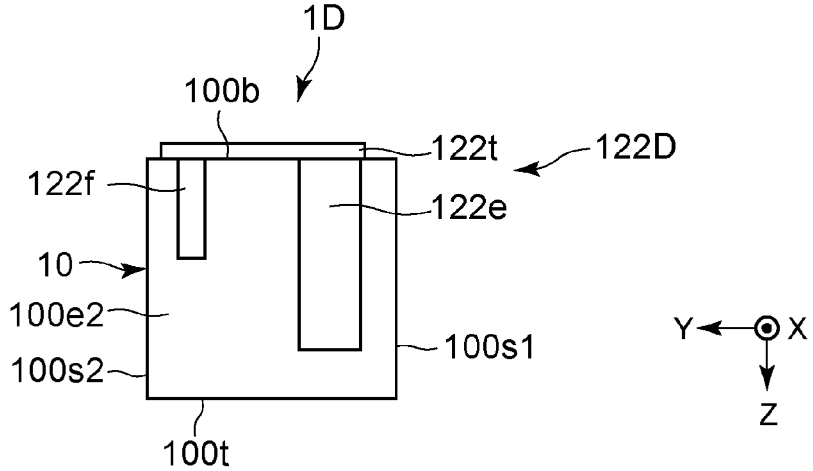
FIG. 9B is a schematic end view showing the third variant of the inductor component seen from the second end surface side.
Figure 9C:
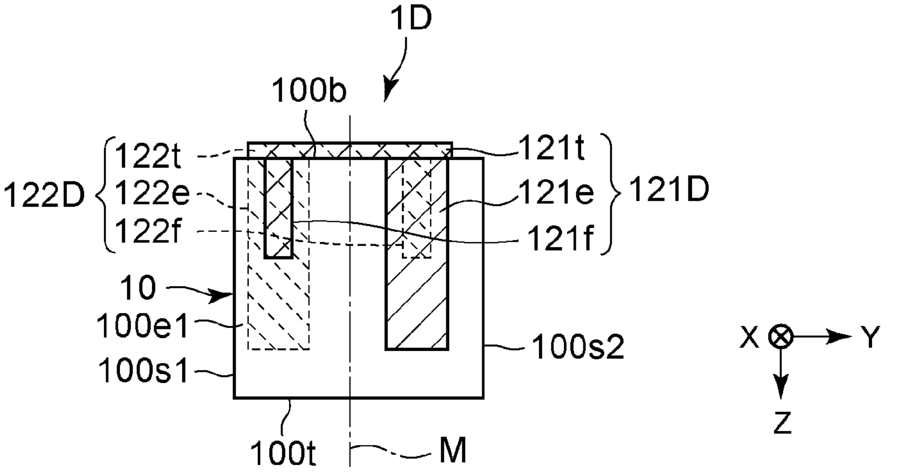
FIG. 9C is a schematic end view showing the third variant of the inductor component seen from the first end surface side.

FIG. 9A is a schematic end view showing a third variant of an inductor component seen from the first end surface 100*e*1 side. FIG. 9B is a schematic end view showing the third variant of the inductor component seen from the second end surface 100*e*2 side. FIG. 9C is a schematic end view showing the third variant of the inductor component seen from the first end surface 100*e*1 side.

As shown in FIGS. 9A and 9B, an inductor component 1D of the third variant differs from the inductor component 1B of the first variant in that its external electrodes 121D and 122D include additional portions 121*f* and 122*f*.

Specifically, as shown in FIG. 9A, the first external electrode 121D includes the first bottom surface portion 121*t*, the first end surface portion 121*e*, and the first additional portion 121*f*. The first bottom surface portion 121*t* and the first end surface portion 121*e* have the same configurations as those of the first bottom surface portion 121*t* and the first end surface portion 121*e* shown in FIG. 7A. The first additional portion 121*f* is disposed on the first end surface 100*e*1 of the base body 10. The first additional portion 121*f* is of a reduced shape of the first end surface portion 121*e* and is arranged in parallel with the first end surface portion 121*e*. The first additional portion 121*f* is connected to the first bottom surface portion 121*t*.

As shown in FIG. 9B, the second external electrode 122D includes the second bottom surface portion 122*t*, the second end surface portion 122*e*, and the second additional portion 122*f*. The second bottom surface portion 122*t* and the second end surface portion 122*e* have the same configurations as those of the second bottom surface portion 122*t* and the second end surface portion 122*e* shown in FIG. 7B. The second additional portion 122*f* is disposed on the second end surface 100*e*2 of the base body 10. The second additional portion 122*f* is of a reduced shape of the second end surface portion 122*e* and is arranged in parallel with the second end surface portion 122*e*. The second additional portion 122*f* is connected to the second bottom surface portion 122*t*.

As shown in FIG. 9C, in the inductor component 1D of the third variant, when viewed from the first end surface 100*e*1 side in X direction, a part of the first end surface portion 121*e* of the first external electrode 121D overlaps the whole of the second additional portion 122*f* of the second external electrode 122D, while a part of the second end surface portion 122*e* of the second external electrode 122D overlaps the whole of the first additional portion 121*f* of the first external electrode 121D. On the other hand, when viewed from the first end surface 100*e*1 side in X direction, the first bottom surface portion 121*t* of the first external electrode 121D overlaps entirely with the second bottom surface portion 122*t* of the second external electrode 122D. In FIG. 9C, for convenience, the exposed portion of the first external electrode 121D is hatched by solid lines, while the exposed portion of the second external electrode 122D is hatched by broken lines.

In this variant as well, when viewed from the first end surface 100*e*1 side in X direction of the base body 10, the center-of-gravity position of the area of the first external electrode 121D and the center-of-gravity position of the area of the second external electrode 122D lie opposite to each other with respect to the center M in Y direction of the base body 10. The center-of-gravity position of the area of the first external electrode 121D and the second external electrode 122D is found by the above-described method of calculating the "center-of-gravity position of the area of the external electrode".

Specifically, when viewed from the first end surface 100*e*1 side in X direction, the first external electrode 121D includes three figures, i.e. the first bottom surface portion 121*t*, the first end surface portion 121*e*, and the first additional portion 121*f*.

A center-of-gravity position X of the area of the first external electrode 121D is found from $$X=(St\times Xt+Se\times Xe+Sf\times Xf)/(St+Se+Sf)$$

where: St is the area of the first bottom surface portion 121*t* and Xt is the center-of-gravity position of the first bottom surface portion 121*t* in Y direction; Se is the area of the first end surface portion 121*e* and Xe is the center-of-gravity position of the first end surface portion 121*e* in Y direction; and Sf is the area of the first additional portion 121*f* and Xf is the center-of-gravity position of the first additional portion 121*f* in Y direction.

The center-of-gravity position of the area of the second external electrode 122D is found in the same manner as in the case of the first external electrode 121D, of which description will be omitted.

The center-of-gravity position of the area of the first external electrode 121D and the center-of-gravity position of the area of the second external electrode 122D found as above are opposite to each other with respect to the center M when viewed from the first end surface 100*e*1 side in X direction, as shown in FIG. 9C. That is, the center-of-gravity position of the area of the first external electrode 121D lies toward the second side surface 100*s*2 with respect to the center M, whereas the center-of-gravity position of the area of the second external electrode 122D lies toward the first side surface 100*s*1 with respect to the center M.

The first additional portion 121*f* and the second additional portion 122*f* may be increased or decreased in number, and the first additional portion 121*f* and the second additional portion 122*f* may differ in number. For example, one first additional portion 121*f* and two second additional portions 122*f* may be disposed or one second additional portion 122*f* may be disposed without the first additional portion 121*f*.

Second Embodiment

Figure 10:
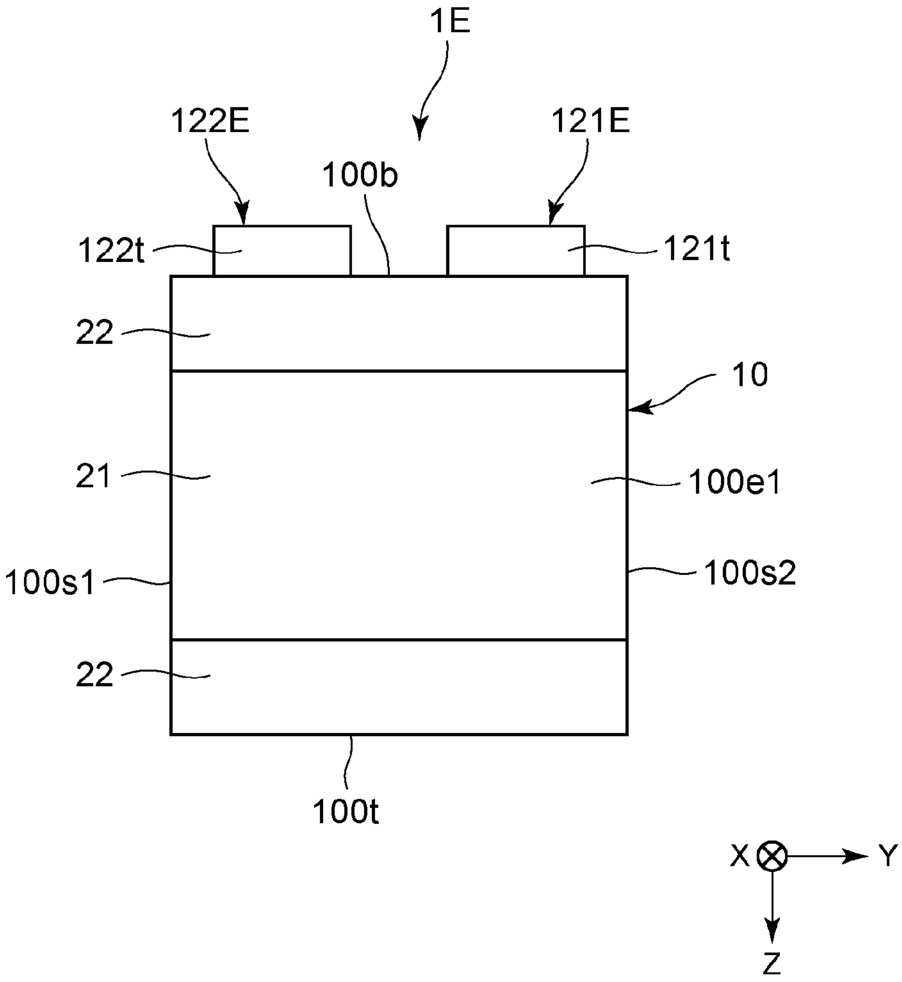
FIG. 10 is a schematic end view showing a second embodiment of an inductor component seen from the first end surface side.

FIG. 10 is a schematic end view showing a second embodiment of an inductor component seen from the first end surface 100*e*1 side. The second embodiment differs from the first embodiment in configuration of the external electrodes. This different configuration will be described below. The other configurations are the same as those in the first embodiment and are designated by the same reference numerals, of which explanations will be omitted.

As shown in FIG. 10, in an inductor component 1E of the second embodiment, a first external electrode 121E and a second external electrode 122E are disposed only on the bottom surface 100*b*. This can further reduce the size of the first external electrode 121E and the second external electrode 122E, enabling further reduction in the stray capacitance between the coil 110 and the first external electrode 121E and between the coil 110 and the second external electrode 122E.

At least a part of the first external electrode 121E and at least a part of the second external electrode 122E protrude from the bottom surface 100*b* outward of the base body 10. This can ensure good mountability of the first external electrode 121E and the second external electrode 122E. Also, electrical characteristics can easily be acquired at the time of characteristic selection in the subsequent process.

Specifically, the first external electrode 121E does not include the first end surface portion 121*e* of the first embodiment and includes the first bottom surface portion 121*t* disposed on the bottom surface 100*b*. The first bottom surface portion 121*t* is disposed on the bottom surface 100*b* in such a manner as to protrude from the bottom surface 100*b*. The first bottom surface portion 121*t* lies closer to the second side surface 100*s*2 on the first end surface 100*e*1 side.

Similarly, the second external electrode 122E does not include the second end surface portion 122*e* of the first embodiment and includes the first bottom surface portion 122*t* disposed on the bottom surface 100*b*. The second bottom surface portion 122*t* is disposed on the bottom surface 100*b* in such a manner as to protrude from the bottom surface 100*b*. The second bottom surface portion 122*t* lies closer to the first side surface 100*s*1 on the second end surface 100*e*2 side.

Although the first external electrode 121E and the second external electrode 122E do not overlap each other when viewed from the first end surface 100*e*1 side, a part of the first external electrode 121E and a part of the second external electrode 122E may overlap each other when viewed from the first end surface 100*e*1 side.

The present disclosure is not limited to the above embodiments and can be altered in design without departing from the gist of the present disclosure. For example, features of the first and second embodiments may variously be combined.

What is claimed is:

1. An inductor component comprising:

a base body having a length, a width, and a height;

a coil disposed in the base body and wound along a direction of an axis; and a first external electrode and a second external electrode both disposed on the base body and electrically connected to the coil, the base body including a first end surface and a second end surface at both ends in the length direction, a first side surface and a second side surface at both ends in the width direction, and a bottom surface and a top surface at both ends in the height direction, the first external electrode being disposed toward the first end surface with respect to a center in the length direction of the base body and exposed from an outer surface of the base body, and the second external electrode being disposed toward the second end surface with respect to the center in the length direction of the base body and exposed from the outer surface of the base body, wherein:

when viewed from the first end surface in the length direction, at least a part of a portion of the first external electrode exposed from the outer surface of the base body does not overlap at least a part of a portion of the second external electrode exposed from the outer surface of the base body, when viewed from the first end surface in the length direction, a center-of-gravity position of an area of the portion of the first external electrode exposed from the outer surface of the base body is opposite to the center-of-gravity position of the area of the portion of the second external electrode exposed from the outer surface of the base body with respect to a center in the width direction of the base body, and when viewed from the first end surface in the length direction, the coil has an upper end and a lower end, the first external electrode has an upper end and a lower end, and the coil upper end extends to connect to the upper end of the first external electrode.

2. The inductor component of claim 1 wherein the base body comprises: a substrate having a bottom surface and a top surface at both ends in the height direction; and an insulating layer covering each of the bottom surface and the top surface of the substrate, and wherein the coil comprises: a bottom surface wire arranged above the bottom surface of the substrate and covered with the insulating layer; a top surface wire arranged above the top surface of the substrate and covered with the insulating layer; and a pair of through wires extending through the substrate from the bottom surface to the top surface, the through wires being arranged opposite to each other with respect to the axis, and the bottom surface wire, a first through wire of the pair of through wires, the top surface, and a second through wire of the pair of through wires being connected in order, to configure at least a part of the coil wound in the direction of the axis.

3. The inductor component of claim 2, wherein the first external electrode is disposed continuously on the first end surface and the bottom surface, and when viewed from the first end surface in the length direction, the first end surface portion of the first external electrode disposed on the first end surface lies on a same side as the through wire to which the first external electrode is connected lies, with respect to the center in the width direction of the base body.

4. The inductor component of claim 2, wherein the first external electrode is disposed continuously on the first end surface and the bottom surface, and the second external electrode is disposed continuously on the second end surface and the bottom surface.

5. The inductor component of claim 2, wherein when viewed from the first end surface in the length direction, the first end surface portion of the first external electrode disposed on the first end surface and a second end surface portion of the second external electrode disposed on the second end surface do not overlap each other.

6. The inductor component of claim 1, wherein the first external electrode is disposed continuously on the first end surface and the bottom surface, and the second external electrode is disposed continuously on the second end surface and the bottom surface.

7. The inductor component of claim 1, wherein when viewed from the first end surface in the length direction, the first end surface portion of the first external electrode disposed on the first end surface and a second end surface portion of the second external electrode disposed on the second end surface do not overlap each other.

8. The inductor component of claim 1, wherein the first external electrode is disposed continuously on the first end surface and the bottom surface, and when viewed from the first end surface in the length direction, the first end surface portion of the first external electrode disposed on the first end surface includes three or more regions each having a dimension different in the width direction along the height direction.

9. The inductor component of claim 8, wherein the three or more regions of the first end surface portion have alternately changing dimensions in the width direction along the height direction in their magnitude relations.

10. The inductor component of claim 1, wherein the first end surface portion of the first external electrode disposed on the first end surface and a second end surface portion of the second external electrode disposed on the second end surface do not overlap the axis of the coil.

11. The inductor component of claim 10, wherein when viewed from the direction of the axis of the coil, the first end surface portion and the second end surface portion do not overlap an inner diameter part of the coil.

12. The inductor component of claim 1, wherein the first end surface portion of the first external electrode disposed on the first end surface and a second end surface portion of the second external electrode disposed on the second end surface each have a dimension in the height direction that is one half or more of a dimension in the height direction of the base body.

13. The inductor component of claim 1, wherein the first external electrode is disposed continuously on the first end surface and the bottom surface, and the first end surface portion of the first external electrode disposed on the first end surface is at least partly raised from the first end surface.

14. The inductor component of claim 1, wherein the first external electrode and the second external electrode are disposed only on the bottom surface, and at least a part of the first external electrode and at least a part of the second external electrode protrude from the bottom surface outward of the base body.

15. The inductor component of claim 1, wherein the base body includes a single-layer glass plate.

16. The inductor component of claim 1, wherein a part of the outer surface of the base body is made of a material different from that of remaining parts of the outer surface.

17. The inductor component of claim 1, wherein the inductor component has a volume of 0.08 $mm^3$ or less, and the inductor component has a long side whose dimension is 0.65 mm or less.

18. The inductor component of claim 1, wherein when viewed from the height direction, the first external electrode and the second external electrode do not overlap the coil.

19. The inductor component of claim 1, wherein when viewed from the first end surface in the length direction, a portion of the first external electrode exposed from the outer surface of the base body is equal in area to a portion of the second external electrode exposed from the outer surface of the base body.

20. An inductor component comprising:

a base body having a length, a width, and a height;

a coil disposed in the base body and wound along a direction of an axis; and a first external electrode and a second external electrode both disposed on the base body and electrically connected to the coil, the base body including a first end surface and a second end surface at both ends in the length direction, a first side surface and a second side surface at both ends in the width direction, and a bottom surface and a top surface at both ends in the height direction, the first external electrode being disposed toward the first end surface with respect to a center in the length direction of the base body and exposed from an outer surface of the base body, and the second external electrode being disposed toward the second end surface with respect to the center in the length direction of the base body and exposed from the outer surface of the base body, wherein:

when viewed from the first end surface in the length direction, at least a part of a portion of the first external electrode exposed from the outer surface of the base body does not overlap at least a part of a portion of the second external electrode exposed from the outer surface of the base body, when viewed from the first end surface in the length direction, a center-of-gravity position of an area of the portion of the first external electrode exposed from the outer surface of the base body is opposite to the center-of-gravity position of the area of the portion of the second external electrode exposed from the outer surface of the base body with respect to a center in the width direction of the base body, and when viewed from the first end surface in the length direction, a first end surface portion of the first external electrode disposed on the first end surface includes three or more regions, each of the three or more regions of the first end surface portion has side edges at both ends in the width direction, and the side edges of each of the three or more regions have a different tilt angle relative to the height direction.

* * * * *